United States Patent
Sirotkin et al.

(10) Patent No.: US 10,104,705 B2
(45) Date of Patent: Oct. 16, 2018

(54) APPARATUS, SYSTEM AND METHOD OF COMMUNICATING BETWEEN A CELLULAR MANAGER AND A USER EQUIPMENT (UE) VIA A WLAN ACCESS DEVICE

(71) Applicant: INTEL IP CORPORATION, Santa Clara, CA (US)

(72) Inventors: Alexander Sirotkin, Giv'on Hachadasha (IL); Martin Kolde, Neubiberg (DE); Alexandre S. Stojanovski, Paris (FR)

(73) Assignee: INTEL IP CORPORATION, Santa Clara, CA (US)

( * ) Notice: Subject to any disclaimer, the term of this patent is extended or adjusted under 35 U.S.C. 154(b) by 246 days.

(21) Appl. No.: 14/747,085

(22) Filed: Jun. 23, 2015

(65) Prior Publication Data

US 2016/0128110 A1 May 5, 2016

Related U.S. Application Data

(60) Provisional application No. 62/075,710, filed on Nov. 5, 2014.

(51) Int. Cl.
*H04W 84/12* (2009.01)
*H04W 76/12* (2018.01)
(Continued)

(52) U.S. Cl.
CPC ......... *H04W 76/12* (2018.02); *H04W 76/022* (2013.01); *H04W 76/021* (2013.01);
(Continued)

(58) Field of Classification Search
CPC ..... H04W 36/22; H04W 92/02; H04W 36/28; H04W 76/021; H04W 76/11;
(Continued)

(56) References Cited

U.S. PATENT DOCUMENTS 8,259,677 B2 * 9/2012 Olsson .................. H04W 36/02
370/328
9,161,264 B2 * 10/2015 Liu ........................ H04W 28/08
(Continued)

FOREIGN PATENT DOCUMENTS

| WO | 2013068787 | 5/2013 |
| WO | 2013162615 | 10/2013 |

(Continued)

OTHER PUBLICATIONS

Office Action for Taiwanese Patent Application Serial No. 104131629, dated Jun. 23, 2016, 26 pages (Including 11 pages of English translation.).

(Continued)

*Primary Examiner* — Ahmed Elallam
(74) *Attorney, Agent, or Firm* — Shichrur & Co.

(57) ABSTRACT

Some demonstrative embodiments include devices, systems and/or methods of communicating between a cellular manager and a User Equipment (UE) via a Wireless Local Area network (WLAN) access device. For example, an air interface to communicate with a User Equipment (UE) via a cellular link; a controller to route at least part of downlink traffic to the UE via a Wireless Local Area Network (WLAN) access device; and an access device interface to send to the WLAN access device a general packet radio service (GPRS) Tunneling Protocol User Plane (GTP-U) packet including the downlink traffic for the UE, and transport bearer information to identify a transport bearer between the eNB and the UE.

14 Claims, 3 Drawing Sheets

(51) Int. Cl.
*H04W 76/02* (2009.01)
*H04W 84/04* (2009.01)
*H04W 76/16* (2018.01)
*H04W 76/11* (2018.01)

(52) U.S. Cl.
CPC .......... *H04W 76/026* (2013.01); *H04W 76/11* (2018.02); *H04W 76/16* (2018.02); *H04W 84/042* (2013.01); *H04W 84/12* (2013.01)

(58) Field of Classification Search
CPC . H04W 76/12; H04W 76/16; H04W 28/0247; H04W 28/0268; H04W 28/10; H04W 36/0066; H04W 84/12; H04W 88/10; H04W 92/10
See application file for complete search history.

(56) References Cited

U.S. PATENT DOCUMENTS

| | | | |
|---|---|---|---|
| 9,408,125 B2* | 8/2016 | Horn | H04W 36/165 |
| 9,414,281 B2* | 8/2016 | Liu | H04W 36/22 |
| 9,629,173 B2* | 4/2017 | Karlsson | H04W 72/10 |
| 9,693,381 B2* | 6/2017 | Jamadagni | H04W 76/025 |
| 2004/0058682 A1 | 3/2004 | Kitchin | |
| 2005/0210154 A1 | 9/2005 | Verma et al. | |
| 2010/0304737 A1 | 12/2010 | Jain et al. | |
| 2011/0222523 A1 | 9/2011 | Fu et al. | |
| 2011/0244865 A1 | 10/2011 | Wu et al. | |
| 2012/0278416 A1* | 11/2012 | Hurtta | H04W 8/082 709/206 |
| 2013/0088983 A1 | 4/2013 | Pragada et al. | |
| 2014/0086211 A1* | 3/2014 | Liu | H04W 36/22 370/331 |
| 2014/0321282 A1 | 10/2014 | Pragada et al. | |
| 2014/0369198 A1* | 12/2014 | Rinne | H04W 40/02 370/235 |
| 2015/0109997 A1 | 4/2015 | Sirotkin et al. | |
| 2016/0234851 A1* | 8/2016 | Zhang | H04W 28/08 |
| 2016/0323798 A1* | 11/2016 | Horn | H04W 36/165 |
| 2016/0323805 A1* | 11/2016 | Ryu | H04W 36/0055 |
| 2016/0373989 A1* | 12/2016 | Tinnakornsrisuphap | H04W 36/22 |

FOREIGN PATENT DOCUMENTS

| | | |
|---|---|---|
| WO | 2014052403 | 4/2014 |
| WO | 2014109606 | 7/2014 |

OTHER PUBLICATIONS

Office Action for Taiwanese Patent Application No. 104131629, dated Dec. 29, 2016, 26 pages (Including 11 pages of English translation).

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

ETSI TS 129 281 V12.0.0 (Oct. 2014); Universal Mobile Telecommunications System (UMTS); LTE; General Packet Radio System (GPRS) Tunnelling Protocol User Plane (GTPv1-U) (3GPP TS 29.281 version 12.0.0 Release 12); Oct. 2014, 29 pages.

3GPP TS 36.300 V11.7.0 (Sep. 2013); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); Sep. 2013, 209 pages.

International Search Report and Written Opinion for International Patent Application No. PCT/US2014/056894, dated Dec. 18, 2014, 8 pages.

International Search Report and Written Opinion for PCT/US2015/054161, dated Jan. 22, 2016, 13 pages.

International Preliminary Report on Patentability for PCT/US2015/054161, dated May 18, 2017, 10 pages.

\* cited by examiner

APPARATUS, SYSTEM AND METHOD OF COMMUNICATING BETWEEN A CELLULAR MANAGER AND A USER EQUIPMENT (UE) VIA A WLAN ACCESS DEVICE

CROSS REFERENCE

This application claims the benefit of and priority from U.S. Provisional Patent Application No. 62/075,710 entitled "RAN Architecture for LTE/WLAN Aggregation Non-Collocated Deployment", filed Nov. 5, 2014, the entire disclosure of which is incorporated herein by reference.

TECHNICAL FIELD

Some embodiments described herein generally relate to communicating between a cellular manager and a User Equipment (UE) via a Wireless Local Area network (WLAN) access device.

BACKGROUND

A wireless communication device, e.g., a mobile device, may be configured to utilize multiple wireless communication technologies.

For example, a User Equipment (UE) device may be configured to utilize a cellular connection, e.g., a Universal Mobile Telecommunications System (UMTS) cellular connection or a Long Term Evolution (LTE) connection, as well as a wireless-local-area-network (WLAN) connection, e.g., a Wireless-Fidelity (WiFi) connection.

There is a need for efficient interworking, integration and/or management of the cellular and WLAN radio access technologies.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
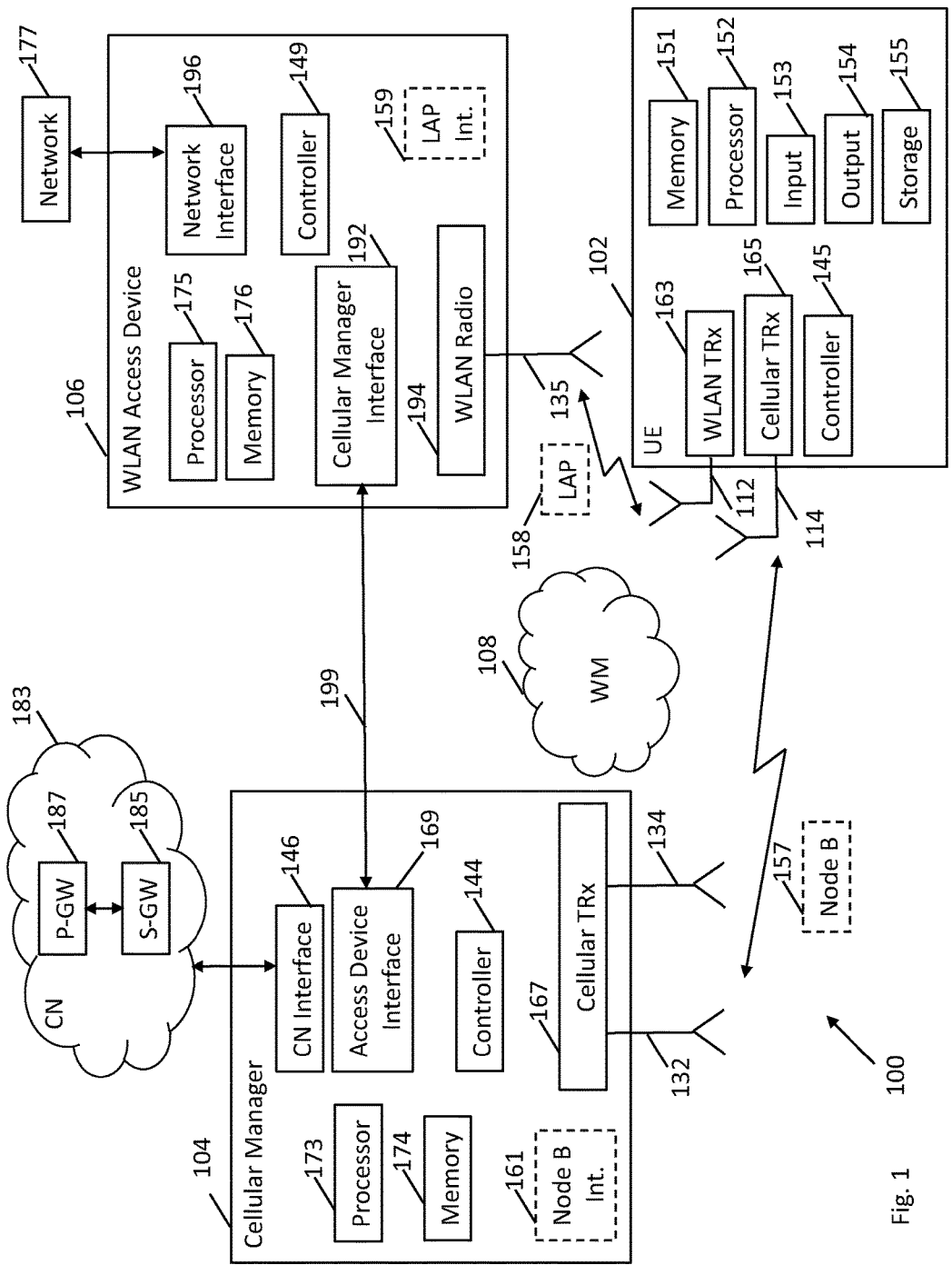
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, an Internet of Things (IoT) device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing 3rd Generation Partnership Project (3GPP) and/or Long Term Evolution (LTE) specifications (including 3GPP TS 36.300 ("*TS 36.300 Evolved Universal Terrestrial Radio Access (E-UTRA) and Evolved Universal Terrestrial Radio Access Network (E-UTRAN); Overall description; Stage 2, version 11.7.0 Release 11*", September 2013); 3GPP TS 29.281 (*ETSI TS 129 281 V12.0.0* (2014-10); *Universal Mobile Telecommunications System (UMTS); LTE; General Packet Radio System (GPRS) Tunneling Protocol User*

Plane (*GTPv1-U*) (*3GPP TS* 29.281 *version* 12.0.0 *Release* 12)); and/or 3GPP TS 36.425) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16e, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments are described herein with respect to a LTE network. However, other embodiments may be implemented in any other suitable cellular network or system, e.g., a Universal Mobile Telecommunications System (UMTS) cellular system, a 3G cellular network, a 4G cellular network, a 5G cellular network, a WiMax cellular network, and the like.

Some demonstrative embodiments are described herein with respect to a WLAN system and/or a WiGig system. However, other embodiments may be implemented in any other suitable non-cellular network.

Some demonstrative embodiments are described herein with respect to an Access Point (AP). However, other embodiments may be implemented in any other WLAN access device, for example, an Access Controller (AC).

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells.

Other embodiments may be used in conjunction with any other suitable wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums 108. For example, system 100 may include at least one User Equipment (UE) 102 capable of communicating with one or more wireless communication networks, e.g., as described below.

Wireless mediums 108 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, system 100 may include at least one cellular manager 104 to manage communication of a cellular network, e.g., as described below.

In some demonstrative embodiments, cellular manager 104 may include and/or may perform the functionality of an Evolved Node B (eNB). For example, cellular manager 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations, communications, and/or functionality.

In other embodiments, cellular manager 104 may include any other functionality and/or may perform the functionality of any other cellular node, network controller, base station or any other node or network device.

In one example, cellular manager 104 may be part of a UMTS. According to this example, cellular manager 104 may perform the functionality of a Radio Network Controller (RNC), which may control a plurality of Node B devices 157. For example, the node B may be configured to communicate directly with UEs, e.g., including UE 102, for example, using a Wideband Code Division Multiple Access (WCDMA) and/or Time Division Synchronous Code Division Multiple Access (TD-SCDMA) air interface technology. The RNC may include, for example, a UMTS RNC configured to control the Node B devices 157.

In some demonstrative embodiments, system 100 may include a WLAN access device 106 to manage access to a non-cellular network 107, for example, a WLAN, e.g., a Basic Service Set (BSS).

In some demonstrative embodiments, WLAN access device 106 may include a WLAN AP, WLAN AC, or WT node, e.g., as described below.

In other embodiments, WLAN access device 106 may include any other functionality and/or may perform the functionality of any other device capable of controlling and/or managing WLAN radio access to one or more wired networks.

In one example, WLAN access device 106 may perform the functionality of an Access Controller (AC). According to this example, WLAN access device 106 may control a plurality of AP devices, e.g., Lightweight Access Point (LAP) devices 158.

In some demonstrative embodiments, UE 102 may include, for example, a Mobile Device (MD), a Station (STA), a mobile computer, a laptop computer, a notebook computer, a tablet computer, an Ultrabook™ computer, an Internet of Things (IoT) device, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, UE 102, cellular manager 104 and/or WLAN access device 106 may include one or more communication interfaces to perform communication between UE 102, cellular manager 104, WLAN access device 106 and/or with one or more other wireless communication devices, e.g., as described below.

Some demonstrative embodiments include an interface 199 (also referred to as "the access device interface", "the horizontal interface", "the Xw interface", "the X2-W interface" or "the cellular/WLAN interface"), which may include circuitry and/or logic configured to interface, e.g., directly, between a cellular network element, e.g., cellular manager 104, and a WLAN element, e.g., WLAN access device 106, as described in detail below.

In some demonstrative embodiments, the WLAN element may include a WLAN Termination (WT) node, which may be configured to terminate a network interface, e.g., as described herein. The functionality of the WT node may be implemented, for example, as part of WLAN access device 106, as part of another device, or as a standalone device.

Some demonstrative embodiments are described herein with respect to one or more functionalities performed by a WLAN access device, for example, a WLAN AP. In other embodiments, one or more of the functionalities and/or operations described herein may be performed by a WT.

In some demonstrative embodiments, interface 199 may be implemented to directly interface between an eNB and a WLAN AP, e.g., as described below. However, in other embodiments, the cellular/WLAN interface 199 may be implemented to directly interface between any other cellular device and any other WLAN device. In one example, the cellular/WLAN interface 199 may be implemented to directly interface between an eNB and a WLAN AC. In another example, the cellular/WLAN interface 199 may be implemented to directly interface between a UMTS RNC and a WLAN AP. In another example, the cellular/WLAN interface 199 may be implemented to directly interface between a UMTS RNC and a WLAN AC.

In some demonstrative embodiments, interface 199 may be utilized to enhance and/or increase the efficiency of interworking, integration and/or management of the cellular and WLAN radio access technologies, e.g., as described below.

In some demonstrative embodiments, interface 199 may be configured to perform and/or support one or more aggregation functionalities, for example, to transfer traffic, e.g., in addition to transferring control plane information.

In some demonstrative embodiments, interface 199 may be utilized to improve efficiency of resource management, to provide efficient load balancing, and/or to improve mobility between Radio Access Technology (RAT) networks, e.g., as described below.

In some demonstrative embodiments, cellular manager 104 may include an interface ("Core Network (CN) interface") 146, e.g., a vertical interface, including circuitry and/or logic to communicate with one or more elements of a CN 183, e.g., an Evolved Packet Core (EPC).

In some demonstrative embodiments, CN interface 146 may include an S1 vertical interface configured to communicate between cellular manager 104 and a Serving Gateway (S-GW) 185 according to an S1 protocol, e.g., if cellular manager 104 performs the functionality of an eNB. According to this example, S-GW 187 may interface between cellular manager 104 and a Packet Data Network (PDN) Gateway (P-GW) 187.

In other embodiments, CN interface 146 may include any other vertical interface with one or more elements of CN 183. For example, cellular manger 104 may perform the functionality of an RNC, e.g., in a UMTS system. According to this example, CN interface 146 may include an Interface Unit Circuit Switch (Iu-CS) interface and/or an Interface Unit Packet Switch (Iu-PS) interface, to interface between the RNC and one or more packet-switched or circuit-switched CN elements.

In some demonstrative embodiments, cellular manager 104 may include an interface including circuitry and/or logic to communicate user plane traffic, directly or indirectly, between CN 183 and UE 102.

In some demonstrative embodiments, cellular manager 104 may communicate the user plane traffic directly with UE 102, for example, if cellular manager 104 performs the functionality of an eNB. According to these embodiments, cellular manager 104 may include an air interface, for example, a cellular transceiver (TRx) 167, including circuitry and/or logic configured to communicate with UE 102 via a cellular link.

In other embodiments, cellular manager 104 may communicate the user plane traffic with UE 102 via Node B 157, e.g., if cellular manager 104 performs the functionality of an RNC. According to these embodiments, cellular manager 104 may include a Node B interface 161 to communicate between the RNC and Node B 157. For example, Node B interface 161 may include an Interface Unit b (Iub).

In some demonstrative embodiments, cellular manager 104 may include an access device interface 169 including circuitry and/or logic to communicate directly with WLAN access device 106, e.g., as described below. In one example, interface 169 may include an AP interface, e.g., if WLAN access device 106 performs the functionality of an AP. In another example, interface 169 may include an AC interface, e.g., if WLAN access device 106 performs the functionality of an AC or a WT node.

In some demonstrative embodiments, WLAN access device 106 may include a cell manager interface ("the cellular interface") 192 including circuitry and/or logic to communicate directly with cellular manager 104, e.g., as described below. In one example, interface 192 may include an eNB interface, e.g., if cellular manager 104 performs the functionality of an eNB. In another example, interface 192 may include a RNC interface, e.g., if cellular manager 104 performs the functionality of a RNC.

In some demonstrative embodiments, interfaces 169 and 192 may be configured to communicate between cellular manager 104 and WLAN access device 106 via a direct link of interface 199, e.g., as described below.

In some demonstrative embodiments, interface 199 may include a Point to Point (P2P) link, e.g., as described below.

In some demonstrative embodiments, interface 199 may be implemented by any wired and/or wireless link, e.g., using any suitable, Physical Layer (PHY) components and/or protocols.

In some demonstrative embodiments, interface 199 may include a wired link.

In some demonstrative embodiments, interface 199 may include a wireless link, for example, a microwave link or a WLAN link, a WiFi link, a Bluetooth link, and/or any other wireless link. In some demonstrative embodiments, interface 199 may include any wired link.

In some demonstrative embodiments, interface 199 may use TCP/IP as a transport protocol. On top of the transport protocol, interface may be configured to use, for example, a Stream Control Transmission Protocol (SCTP), for a control plane, and/or a User Datagram Protocol (UDP) for a user plane. On top of the SCTP, interface 199 may use, for example, a new Application Protocol, e.g., for the control plane. On top of UDP, interface 199 may be configured to use, for example, GTP-U, e.g., for the user plane.

In some demonstrative embodiments, WLAN access device 106 may include a network interface 196 including circuitry and/or logic to communicate network traffic with a wired network 177, e.g., the Internet or any other network.

In some demonstrative embodiments, WLAN access device 104 may include an interface including circuitry and/or logic to communicate the network traffic and/or any other traffic, directly or indirectly, with UE 102.

In some demonstrative embodiments, WLAN access device 106 may communicate directly with UE 102, for example, if WLAN access device 106 performs the functionality of an AP. According to these embodiments, WLAN access device 106 may include a WLAN radio 194 including circuitry and/or logic to communicate the network traffic and/or any other traffic directly with UE 102, e.g., via a WLAN link between WLAN access device 106 and UE 102, for example, if WLAN access device 106 performs the functionality of an AP.

In some demonstrative embodiments, WLAN access device 106 may indirectly communicate with UE 102, for example, if WLAN access device 106 performs the functionality of an AC. According to these embodiments, WLAN access device 106 may include an AP interface, e.g., a LAP interface 159, to communicate the network traffic and/or any other traffic with LAP 158.

In some demonstrative embodiments, UE 102 may include a WLAN transceiver (TRx) 163 including circuitry and/or logic configured to communicate with a WLAN device, e.g., with WLAN access device 106 and/or with LAP 158, via the WLAN link.

In some demonstrative embodiments, UE 102 may include a cellular transceiver (TRx) 165 including circuitry and/or logic configured to communicate with a cellular device, e.g., cellular manager 104 and/or Node B 157, via the cellular link.

In some demonstrative embodiments, WLAN access device 106 may include at least one controller 149 to control one or more functionalities and/or communications performed by WLAN access device 106, cellular manager 104 may include at least one controller 144 to control one or more functionalities and/or communications performed by cellular manager 104, and/or UE 102 may include at least one controller 145 to control one or more functionalities and/or communications performed by UE 102, e.g., as described below.

In some demonstrative embodiments, controllers 149, 144 and/or 145 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 149, 144 and/or 145, respectively. Additionally or alternatively, one or more functionalities of controllers 149, 144 and/or 145 may be implemented by logic, which may be executed by a machine and/or one or more processors, e.g., as described below.

In some demonstrative embodiments, WLAN TRx 163, cellular TRx 165, cellular TRx 167 and/or WLAN radio 194 may include one or more wireless transmitters, receivers and/or transceivers including circuitry and/or logic to send and/or receive wireless communication signals, RF signals, frames, blocks, transmission streams, packets, messages, data items, and/or data.

In some demonstrative embodiments, cellular TRx 167 and/or cellular TRx 165 may include a multiple input multiple output (MIMO) transmitters receivers system (not shown), which may be capable of performing antenna beamforming methods, if desired. In other embodiments, cellular TRx 167 and/or cellular TRx 165 may include any other transmitters and/or receivers.

In some demonstrative embodiments, cellular TRx 167 and/or cellular TRx 165 may include LTE, WCDMA and/or TD-SCDMA modulators and/or demodulators (not shown) configured to communicate downlink signals over downlink channels, e.g., between cellular manager 104 and UE 102, and uplink signals over uplink channels, e.g., between UE 102 and cellular manager 104. In other embodiments, cellular TRx 167 and/or cellular TRx 165 may include any other modulators and/or demodulators.

In some demonstrative embodiments, UE 102 may establish a WLAN link with WLAN access device 106. For example, WLAN TRx 163 may perform the functionality of one or more STAs, e.g., one or more WiFi STAs, WLAN STAs, and/or DMG STAs. The WLAN link may include an uplink and/or a downlink. The WLAN downlink may include, for example, a unidirectional link from WLAN access device 106 to the one or more STAs. The uplink may include, for example, a unidirectional link from a STA to WLAN access device 106.

In some demonstrative embodiments, UE 102, WLAN access device 106 and/or cellular manager 104 may include, or may be associated with, one or more antennas. In one example, WLAN TRx 163 and cellular TRx 165 may be associated with at least two antennas, e.g., antennas 112 and 114, or any other number of antennas, e.g., one antenna or more than two antennas; cellular TRx 167 may be associated with at least two antennas, e.g., antennas 132 and 134, or any other number of antennas, e.g., one antenna or more than two antennas; and/or WLAN radio 194 may be associated with one or more antennas 135.

In some demonstrative embodiments, antennas 112, 114, 132, 134 and/or 135 may include any type of antennas suitable for transmitting and/or receiving wireless communication signals, blocks, frames, transmission streams, packets, messages and/or data. For example, antennas 112, 114, 132, 134 and/or 135 may include any suitable configuration, structure and/or arrangement of one or more antenna elements, components, units, assemblies and/or arrays. For example, antennas 112, 114, 132, 134 and/or 135 may include a phased array antenna, a dipole antenna, a single element antenna, a set of switched beam antennas, and/or the like.

In some embodiments, antennas 112, 114, 132, 134 and/or 135 may implement transmit and receive functionalities using separate transmit and receive antenna elements. In some embodiments, antennas 112, 114, 132, 134 and/or 135 may implement transmit and receive functionalities using common and/or integrated transmit/receive elements.

In some demonstrative embodiments, cellular manager 104, WLAN access device 106, and/or UE 102 may also include, for example, one or more of a processor, an input unit, an output unit, a memory unit, and/or a storage unit. For example, cellular manager 104 may include a processor 173 and/or a memory 174; WLAN access device 106 may include a processor 175 and/or a memory 176; and/or UE 102 may include a memory 151, a processor 152, an input unit 153, an output unit 154, and/or a storage unit 155. UE 102, cellular manager 104 and/or WLAN access device 106 may optionally include other suitable hardware components and/or software components. In some demonstrative embodiments, some or all of the components of one or more of UE 102, cellular manager 104 and/or WLAN access device 106 may be enclosed in a common housing or packaging, and may be interconnected or operably associated using one or more wired or wireless links. In other embodiments, components of one or more of UE 102, cellular manager 104 and/or WLAN access device 106 may be distributed among multiple or separate devices.

Processors 173, 175 and/or 152 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. For example, processor 173 may execute instructions, for example, of an Operating System (OS) of cellular manager 104 and/or of one or more suitable applications; processor 175 may execute instructions of an OS of WLAN access device 106 and/or of one or more suitable applications; and/or processor 152 may execute instructions of an OS of UE 102 and/or of one or more suitable applications.

Input unit 153 includes, for example, a keyboard, a keypad, a mouse, a touch-screen, a touch-pad, a track-ball, a stylus, a microphone, or other suitable pointing device or input device. Output unit 154 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 174, 176 and/or 151 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 155 includes, for example, a hard disk drive, a floppy disk drive, a Compact Disk (CD) drive, a CD-ROM drive, a DVD drive, or other suitable removable or non-removable storage units. For example, memory unit 174 may store data processed by cellular manager 104; and/or memory unit 176 may store data processed by WLAN access device 106.

In some demonstrative embodiments, UE 102 may be configured utilize a cellular connection, e.g., a LTE cellular connection or any other cellular connection, to communicate with cellular manager 104, and a WLAN connection, e.g., a Wireless-Fidelity (WiFi) connection, a mmWave connection, a P2P connection, or any other WLAN, e.g., WiGig, connection, to communicate with WLAN access device 106.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi-Radio Access Technology (Multi-RAT) Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In other embodiments, system 100 may implement any other architecture and/or deployment.

In some demonstrative embodiments, cellular manager 104 and/or WLAN access device 106 may be configured to communicate via interface 199, for example, to enhance and/or increase the efficiency of interworking, integration and/or management of the cellular and WLAN radio access technologies, e.g., as described below.

In some demonstrative embodiments, cellular manager 104 and/or WLAN access device 106 may be configured to communicate via interface 199, for example, at least to control LTE/WLAN aggregation, and/or to communicate traffic for LTE/WLAN aggregation.

In some demonstrative embodiments, cellular manager 104 and/or WLAN access device 106 may be configured to communicate via interface 199, for example, at least to transport data packets, e.g., Packet Data Convergence Protocol (PDCP) Protocol Data Units (PDUs), cellular manager 104 and WLAN access device 106, to control aggregation, e.g., from cellular manager 104 to WLAN access device 106, and/or to gather statistics and/or other information, e.g., from WLAN access device 106 to cellular manager 104, e.g., as described below.

In some demonstrative embodiments, cellular manager 104 and/or WLAN access device 106 may be configured to communicate directly via interface 199, for example, to improve efficiency of resource management, to provide efficient load balancing, and/or to improve mobility between Radio Access Technology (RAT) networks, e.g., as described below.

In some demonstrative embodiments, cellular manager 104 and/or WLAN access device 106 may be configured according to a network architecture of a non-collocated LTE/WLAN aggregation, e.g., in which cellular manager 104 and WLAN access device 106 are not collocated as part of an integrated device and/or in which interface 199 is not an internal interface.

In some demonstrative embodiments, cellular manager 104 and/or WLAN access device 106 may be configured to communicate, e.g., via interface 199, in accordance with a dual connectivity (DC) architecture for split bearers, e.g., as described below.

In some demonstrative embodiments, the DC architecture may be configured to enable cellular manager 104 to send packets belonging to a single bearer either directly to UE 102 or via WLAN access device 106.

In some demonstrative embodiments, the DC architecture may be configured to support packets in the form of PDCP PDUs.

In other embodiments, cellular manager 104 and/or WLAN access device 106 may be configured to communicate in accordance with any other additional or alternative architecture.

In some demonstrative embodiments, controller 144 may control cellular TRx 167 to communicate with UE 102 traffic of at least one Evolved Universal Mobile Telecommunications System (UMTS) Terrestrial Radio Access Network (E-UTRAN) Radio Access Bearer (E-RAB).

In some demonstrative embodiments, controller 144 may be configured to cause cellular manager 104 to route at least part of the traffic of the E-RAB via WLAN access device 106, e.g., as described below.

In some demonstrative embodiments, cellular manager 104 and/or WLAN access device 106 may be configured to communicate user plane messages and/or control plane messages via interface 199, e.g., as described below.

In some demonstrative embodiments, cellular manager 104 and/or WLAN access device 106 may be configured to communicate via interface 199 user plane packets including user plane traffic corresponding to UE 102, e.g., as described below.

In some demonstrative embodiments, the user plane packets may include downlink traffic to be provided to UE 102, e.g., as described below.

In some demonstrative embodiments, the downlink traffic may include downlink traffic from CN 183 ("the CN downlink traffic"), e.g., as described below.

In some demonstrative embodiments, the downlink traffic may include PDCP PDUs, e.g., as described below.

In some demonstrative embodiments, cellular manager 104 may receive the CN downlink traffic, e.g., via CN interface 146. Cellular manager 104 may cause access device interface 169 to send the CN downlink traffic to WLAN access device 106. According to these embodiments, WLAN access device 106 may receive the CN download traffic from cellular manager 104, e.g., via interface 192, and may send the CN download traffic to UE 102 via the WLAN.

In one example, WLAN access device 106 may directly transmit the CN downlink traffic to UE 102, e.g., via WLAN radio 194, for example, if WLAN access device 106 performs the functionality of an AP.

In another example, WLAN access device 106 may send the CN downlink traffic to UE 102 via LAP 158, e.g., via LAP interface 159, for example, if WLAN access device 106 performs the functionality of an AC.

In some demonstrative embodiments, WLAN access device 106 may be configured to use a new Ether-type, which may be configured, for example, to allow a receiving UE, e.g., UE 102, to determine and/or identify that received traffic is part of "LTE/WLAN aggregation" traffic from the CN.

In some demonstrative embodiments, transferring the downlink traffic between cellular manager 106 and WLAN access device 104 via interface 199 may enable, for example, to enhance, e.g., optimize, mobility of UE 102 between the cellular and WLAN radio networks.

In some demonstrative embodiments, cellular manager 104 and/or WLAN access device 106 may be configured to communicate user plane traffic over interface 199 via one or more tunneling packets, e.g., as described below.

In some demonstrative embodiments, cellular manager 104 and/or WLAN access device 106 may be configured to communicate user plane traffic over interface 199, for example, using general packet radio service (GPRS) Tunneling Protocol User Plane (GTP-U) packets, e.g., as described below.

In other embodiments, cellular manager 104 and/or WLAN access device 106 may be configured to communicate user plane traffic over interface 199 via any other packets.

In some demonstrative embodiments, controller 144 may be configured to route at least part of the downlink traffic to UE 102 via WLAN access device 106. The downlink traffic may belong, for example, to at least one bearer between cellular manager 104 and UE 102.

In some demonstrative embodiments, cellular manager 104 and/or WLAN access device 106 may be configured to communicate over interface 199 according to a bearer model, which may be configured to map between one or more transport bearers, e.g., between cellular manager 104 and UE 102, and one or more bearers between WLAN access device 106 and UE 102 ("WLAN bearers"), e.g., as described below.

In some demonstrative embodiments, the transport bearer may be identified over interface 199, for example, using a GTP-U Tunnel Endpoint Identifier (TEID), e.g., corresponding to the UE. For example, controller 144 may be configured to assign the TEID to identify a transport bearer between cellular manager 106 and UE 102.

In some demonstrative embodiments, a WLAN bearer may be identified, e.g., on the air interface between UE 102 and WLAN access device 106, using a WLAN bearer identifier, e.g., as described below.

In some demonstrative embodiments, controller 149 may assign the WLAN bearer identifier (ID) to identify a WLAN bearer between WLAN access device 106 and UE 102.

In some demonstrative embodiments, the WLAN bearer identifier may include a virtual Media Access Control (MAC) address ("VMAC address" or "V-AMC address"), for example, a WLAN AP virtual MAC address.

In some demonstrative embodiments, the WLAN bearer identifier may include a parameter, e.g., a dedicated parameter, which may be, for example, included in a header of a protocol used on the WLAN air interface, for example, above a WLAN MAC, e.g. an enhanced WLAN Control Plane (WLCP) protocol, or any other protocol.

In some demonstrative embodiments, cellular manager 104 and/or WLAN access device 106 may be configured, for example, to use a GTP-U protocol over User Datagram Protocol (UDP) over Internet Protocol (IP) to transport a data stream of the user plane traffic, e.g., of Packet Data Convergence Protocol (PDCP) Protocol Data Units (PDUs), over interface 199.

In some demonstrative embodiments, the GTP-U packet carrying downlink traffic of a transport bearer may include a header having a structure, for example, in accordance with a structure of a Downlink (DL) USER DATA (PDU Type 0) for dual connectivity, e.g., as follows:

TABLE 1

| Bits | | | | | | | | Number of Octets |
|---|---|---|---|---|---|---|---|---|
| 7 | 6 | 5 | 4 | 3 | 2 | 1 | 0 | |
| PDU Type (=0) | | | | spare | | | | 1 |
| X2-U Sequence Number | | | | | | | | 2 |
| Spare extension | | | | | | | | 0-4 |

In other embodiments, the GTP-U packet carrying the downlink traffic of the transport bearer may include any other packet structure.

In some demonstrative embodiments, controller 144 may cause access device interface 169 to send to WLAN access device 106 a packet, for example, a GTP-U packet, including the downlink traffic for UE 102, and transport bearer information to identify the transport bearer between cellular node 104 and UE 102.

In some demonstrative embodiments, the transport bearer information may include the TEID corresponding to UE 102.

In some demonstrative embodiments, the transport bearer information may include a WLAN Media Access Control (MAC) address corresponding to UE 102.

In some demonstrative embodiments, a GTP-U packet carrying downlink traffic of a transport bearer may include a GTP-U TEID to identify the transport bearer.

In some demonstrative embodiments, cellular manager interface 192 may receive the packet, e.g., the GTP-U packet, including the downlink traffic for UE 102, and the transport bearer information to identify the transport bearer between cellular manager 104 and UE 102.

In some demonstrative embodiments, controller 149 may determine the WLAN bearer between WLAN access device 106 and UE 102, for example, based on the transport bearer information.

In some demonstrative embodiments, controller 149 may cause the UE interface of WLAN access device 106, e.g., radio 194, to send the downlink traffic to UE 102 via the WLAN bearer.

In some demonstrative embodiments, cellular manager 104 and/or WLAN access device 106 may be configured to communicate user plane control information over interface 199 via one or more tunneling packets, e.g., as described below.

In some demonstrative embodiments, the user plane control information may include WLAN link information from WLAN access device 106 to cellular manager 104, e.g., as described below.

In some demonstrative embodiments, the WLAN link information may correspond to the WLAN link between the WLAN access device 106 and the UE 102.

In some demonstrative embodiments, the WLAN link information may include an average data rate corresponding to the WLAN link.

In some demonstrative embodiments, the WLAN link information may include link quality information corresponding to the WLAN link.

In some demonstrative embodiments, the WLAN link information may include a WLAN buffer status corresponding to the WLAN link.

In some demonstrative embodiments, the WLAN link information may include delivered and lost PDCP PDU information.

In some demonstrative embodiments, the WLAN link information may include any other additional or alternative information.

In some demonstrative embodiments, controller 149 may cause cellular manager interface 192 to send to cellular manager 104 a GTP-U packet including WLAN link information corresponding to a WLAN link between WLAN access device 106 and UE 102. For example, the WLAN link may correspond to the WLAN bearer, which may correspond to the transport bearer identified by the cellular manager 104.

In some demonstrative embodiments, access device interface 169 may receive the GTP-U packet from WLAN access device 106, e.g., via interface 199, and controller 144 may process the WLAN link information in the GTP-U packet.

In other embodiments, cellular manager 104 and/or WLAN access device 106 may communicate the WLAN link information using any other type or format or packet.

In some demonstrative embodiments, the GTP-U packet carrying the WLAN link information may have a structure, for example, in accordance with a structure of a DL DATA DELIVERY STATUS (PDU Type 1) for dual connectivity, e.g., as follows:

TABLE 2

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Spare | | Final Frame Ind. | Lost Packet Report | 1 |
| Highest successfully delivered PDCP Sequence Number | | | | | | | | 2 |
| Desired buffer size for the E-RAB | | | | | | | | 4 |
| Desired buffer size for the UE | | | | | | | | 4 |
| Number of lost X2-U Sequence Number ranges reported | | | | | | | | 1 |
| Start of lost X2-U Sequence Number range | | | | | | | | 4 * (Number of reported lost X2-u SN ranges) |
| End of lost X2-U Sequence Number range | | | | | | | | |
| Average data rate | | | | | | | | 1 |
| Link quality | | | | | | | | 1 |
| Spare extension | | | | | | | | 0-4 |

In other embodiments, the GTP-U packet carrying the WLAN link information may include any other packet structure.

In some demonstrative embodiments, controller 144 may be configured to control routing of the downlink traffic to UE 102 via WLAN access device 106, for example, based at least on the WLAN link information received from WLAN access device 106.

In some demonstrative embodiments, controller 144 may use the WLAN link information, for example, to implement one or more flow control functionalities, for example, to control the amount of packets sent to WLAN access device 106, e.g., based on an amount of traffic that WLAN access device 106 is able to handle. For example, a WLAN air interface may typically be slower than a network interface and, accordingly, if cellular manager 104 will keep sending packets to WLAN access device 106, buffers of WLAN access device 106 may over flow.

In some demonstrative embodiments, WLAN access device 106 may be configured to send to cellular manager 104, e.g., via interface 199, information regarding an average rate on the WLAN interface, statistics about packets that have been delivered via WLAN, and/or any additional or alternative information, for example, to be used by controller 144 to implement optimum scheduling, e.g., between LTE and WLAN, for example, to improve aggregation performance gains.

In some demonstrative embodiments, cellular manager 104 and/or WLAN access device 106 may be configured to communicate via interface 199 control plane messages, for example, at least to control and/or coordinate one or more operations and/or functionalities of cellular manager 104 and/or WLAN access device 106, e.g., as described below.

In some demonstrative embodiments, controller 144 may be configured to cause access device interface 169 to send a message, e.g., an WLAN addition request, to WLAN access device 106, for example, to request WLAN access device 106 to prepare the WLAN for transmitting bearer traffic to UE 102, e.g., as described below.

In some demonstrative embodiments, the WLAN addition request message may be configured to "activate aggregation" for a particular WLAN with a particular UE and, accordingly, WLAN addition request message may be configured to indicate a UE identifier and/or bearer identifier(s), e.g., as described below.

In some demonstrative embodiments, the WLAN addition request may include a WLAN identifier of the UE 102, e.g., as described below.

In some demonstrative embodiments, the WLAN addition request may include an identifier of the E-RAB, and one or more Quality of Service (QoS) parameters corresponding to the E-RAB.

In some demonstrative embodiments, the WLAN addition request may include an identifier of a general packet radio service (GPRS) Tunneling Protocol (GTP) endpoint corresponding to cellular manager 104.

In some demonstrative embodiments, the WLAN addition request may include UE WLAN capability parameter information corresponding to one or more WLAN capabilities of UE 102, and/or a UE WLAN security key to be used to secure communications with UE 102.

In some demonstrative embodiments, WLAN access device 106 may receive the WLAN addition request, e.g., via interface 192.

In some demonstrative embodiments, controller 149 may be configured to determine a WLAN bearer to communicate between WLAN access device 106 and the UE 102 identified by the WLAN addition request.

In some demonstrative embodiments, controller 149 may be configured to cause interface 192 to send to cellular manager 104 a message, e.g., a WLAN addition acknowledge message, to acknowledge the WLAN addition request.

In some demonstrative embodiments, controller 149 may be configured to cause interface 192 to send to cellular manager 104 an indication that aggregation has been successfully activated, e.g., after UE 102 has associated with WLAN access device 106. This indication may be provided, for example, in the WLAN addition acknowledge message, or in a separate message, e.g., a WLAN addition completion message. Cellular manager 104 may use the indication that aggregation has been successfully activated, for example, to switch a GTP-U tunnel to a new WLAN access device or WT.

In some demonstrative embodiments, the WLAN addition acknowledge may include a WLAN bearer identifier of the WLAN bearer between the WLAN access device 106 and the UE 102.

In some demonstrative embodiments, the WLAN bearer identifier may include, for example, a WLAN virtual MAC.

In some demonstrative embodiments, the WLAN bearer identifier may include, for example, a dedicated bearer identifier in a header of a WLAN air interface In some demonstrative embodiments, the WLAN addition acknowledge may include an identifier of a general packet radio service (GPRS) Tunneling Protocol (GTP) endpoint corresponding to WLAN access device 106.

In some demonstrative embodiments, controller 149 may be configured to process reception of the message, e.g., the WLAN addition acknowledge, from the WLAN access device 106, e.g., via the access device interface 169.

In some demonstrative embodiments, controller 144 may be configured to cause the air interface of cellular manger 104, e.g., cellular TRx 167, to send to UE 102 a message, e.g., a Radio Resource Control (RRC) message, including a request to associate with WLAN access device 106, and the WLAN bearer identifier.

In some demonstrative embodiments, controller 149, may be configured to cause the UE interface of WLAN access device 106, e.g., WLAN radio 194, to associate with UE 102, e.g., based on the WLAN identifier of UE 102.

In some demonstrative embodiments, controller 144 may be configured to send to WLAN access device 106 a message, e.g., a WLAN modification request, to perform, with respect to a UE context corresponding to UE 102, at least one modification, for example, to modify one or more parameters corresponding to the E-RAB, releasing routing of the E-RAB via the WLAN access device 106, and/or adding another E-RAB to be routed via the WLAN access device 106, e.g., as described below.

In some demonstrative embodiments, controller 144 may be configured to determine to move the E-RAB to another WLAN access device (not shown in FIG. 1). According to these embodiments, controller 144 may be configured to cause access device interface 169 to send another WLAN addition request to the another WLAN access device, e.g., similar to the operation of sending the WLAN addition request described above.

In some demonstrative embodiments, controller 144 may be configured to process reception of another WLAN addition acknowledge from the another WLAN access device via access device interface, 169. The another WLAN addition acknowledge may include, for example, another WLAN bearer identifier of another WLAN bearer between the another WLAN access device and UE 102. According to these embodiments, controller 144 may be configured to cause the air interface of cellular manager 104, e.g., cellular TRx 167, to send to UE 102 another RRC message including a request to associate with the other WLAN access device and the other WLAN bearer identifier.

In some demonstrative embodiments, controller 144 may be configured to send to WLAN access device 106 a message, e.g., a WLAN release request, to release a UE context at WLAN access device 106. For example, the WLAN release request may include a list of one or more E-RAB identifiers associated with the UE context, e.g., as described below.

In some demonstrative embodiments, cellular manager 104 and/or WLAN access device 106 may be configured to communicate control plane massages via interface 199, for example, according to a control plane protocol (also referred to as "Xw-AP protocol"), e.g., as described below.

In some demonstrative embodiments, the control plane protocol may include a setup procedure method, process and/or algorithm ("Xw Setup"), e.g., as described below.

In some demonstrative embodiments, the Xw Setup procedure may be configured to exchange configuration data, which may be used, for example, by cellular manager 104 and/or WLAN access device 106, for example, to interoperate correctly over the Xw interface 199.

In some demonstrative embodiments, the Xw setup procedure may be initiated cellular manager 104 or by WLAN access device 106.

In some demonstrative embodiments, the Xw Setup procedure may include, for example, communicating a Xw Setup Request, communicating a Xw Setup Response, and/or communicating a Xw Setup Failure message, e.g., as described below.

In some demonstrative embodiments, controller 144 may cause interface 169 to send to WLAN Access device 106 an Xw Setup Request message, e.g., via interface 199; and/or controller 149 may cause interface 192 to send to cellular manager 104 an Xw Setup Response message, e.g., via interface 199.

In some demonstrative embodiments, controller 149 may cause interface 192 to send to cellular manager 104 an Xw Setup Request message, e.g., via interface 199; and/or controller 144 may cause interface 169 to send to WLAN access device 104 an Xw Setup Response message, e.g., via interface 199.

In some demonstrative embodiments, an Xw Setup message from WLAN access device 106 to cellular manager 104, e.g., a Xw Setup Response, may include, for example, WLAN channel/frequency information corresponding to one or more WLAN channels and/or frequencies supported by WLAN access device 106; WLAN bandwidth information corresponding to a WLAN bandwidth supported by WLAN access device 106; WLAN technology information corresponding to one or more wireless communication technologies supported by WLAN access device 106, e.g., IEEE 802.11g, IEEE 802.11n, IEEE 802.11ac, IEEE 802.11ad, and the like; one or more WLAN identifiers of WLAN access device 106, e.g., a Service Set ID (SSID), a Homogenous Extended Service Set ID (HESSID), a Basic Service Set ID (BSSID), one or more Hot Spot (HS) 2.0 identifiers, and the like; and/or any other information.

In some demonstrative embodiments, controller 149 may be configured to cause interface 192 to send a load information message ("Xw Load information") to cellular manager 104, e.g., via interface 199.

In some demonstrative embodiments, WLAN access device 106 may send the Xw load information message periodically.

In some demonstrative embodiments, WLAN access device 106 may send the Xw load information message, for example, based on a request from cellular manager 104.

In some demonstrative embodiments, the Xw load information message may include for example, BSS load/channel utilization information corresponding to a load of WLAN access device 106; Backhaul rate information and/or Backhaul load information corresponding to a backhaul load of WLAN access device 106; Station count information corresponding to a number of stations in connection with WLAN access device 106; Interference information corresponding to interference experienced by WLAN access device 106, and/or any other information.

In some demonstrative embodiments, cellular manager 104 and/or WLAN access device 106 may be configured to perform one or more operations, e.g., of a procedure (Xw WLAN addition procedure"), for example, to establish a UE context corresponding to UE 102 at WLAN access device 106, e.g., as described below.

In some demonstrative embodiments, controller 144 may be configured to initiate the WLAN Addition procedure, for example, to establish a UE context corresponding to UE 102 at WLAN access device 106, e.g., in order to provide radio resources from WLAN access device 106 to UE 102.

In some demonstrative embodiments, controller 144 may be configured to initiate the WLAN Addition procedure, for example, to move at least one E-RAB to the WLAN and/or to add WLAN to one or more E-RABs, e.g., if bearer split is used.

In some demonstrative embodiments, the Xw WLAN addition procedure may include, for example, communicating a request message ("WLAN Addition Request") from cellular manager 104 to WLAN access device 106, and/or communicating a response message ("WLAN Addition Response" or "WLAN Addition Acknowledge") or a failure message ("WLAN Addition Failure") from WLAN access device 106 to cellular manager 104, e.g., as described below.

In some demonstrative embodiments, cellular manager 104 may decide to move one or more E-RABs to WLAN. The cellular manager 104 may send a WLAN Addition Request to WLAN access device 106, for example, to indicate the decision to move the one or more E-RABs to the WLAN.

In some demonstrative embodiments, the WLAN addition request may include, for example, one or more E-RAB parameters corresponding to the E-RAB; Tunneling (TNL) address information to be used to tunnel user plane traffic, e.g., a GTP-U TEID; WLAN information corresponding to the UE 102, for example, a UE WLAN identifier of UE 102, e.g., a UE WLAN MAC of UE 102, UE capability information corresponding to one or more WLAN capabilities of UE 102, WLAN security information to be used to secure communication with UE 102, e.g., one or more security keys, and/or any other information.

In some demonstrative embodiments, WLAN access device 106 may receive the WLAN addition request message, and controller 149 may select whether or not to accept the request.

In some demonstrative embodiments, for example, if controller 149 selects to accept the WLAN addition request, controller 149 may cause WLAN access device 106 to respond with a WLAN Addition Response.

In some demonstrative embodiments, the WLAN Addition Response may include, for example, a WLAN bearer identifier, for example, a Virtual MAC (V-MAC) or any other bearer identifier, which may be assigned to the E-RAB, for example, by controller 149.

In some demonstrative embodiments, for example, if controller 149 selects not to accept the WLAN addition request, controller 149 may cause WLAN access device 106 to respond with a WLAN Addition Failure Message.

In some demonstrative embodiments, cellular manager 104 may receive the WLAN addition Response message, e.g., via interface 199, and controller 144 may cause cellular TRx 167 to send to UE 102 a message to instruct the UE 102 to associate with the WLAN.

In some demonstrative embodiments, controller 144 may cause cellular TRx 167 to send to UE 102 an RRC message, for example, a RRCConnectionReconfiguration message or any other RRC message, including, e.g., among other parameters, the WLAN bearer identifier, e.g., the V-MAC or the other WLAN bearer identifier, received from WLAN access device 106.

In some demonstrative embodiments, UE 102 may use the WLAN bearer identifier to associate with WLAN access device 106.

In some demonstrative embodiments, controller 149 may cause WLAN access device 106 to indicate to cellular manager 104 that the WLAN addition procedure was successful, e.g., upon completing the association with UE 102.

In some demonstrative embodiments, the WLAN Addition Request may have, for example, a structure including one or more information elements, e.g., as follows:

WLAN Addition Request

This message is sent by the eNB to the WLAN to request the preparation of resources for aggregation operation for a specific UE Direction: eNB→WLAN.

TABLE 3

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB UE X2AP ID | M | | eNB UE X2AP ID 9.2.24 | Allocated at the eNB | YES | reject |
| WLAN UE Aggregate Maximum Bit Rate | M | | UE Aggregate Maximum Bit Rate 9.2.12 | The UE Aggregate Maximum Bit Rate is split into eNB UE Aggregate Maximum Bit Rate and WLAN UE Aggregate Maximum Bit Rate which are enforced by eNB and WLAN respectively. | YES | reject |
| E-RABs To Be Added List | | 1 | | | YES | reject |
| >E-RABs To Be Added Item | | 1 ... <maxnoof Bearers> | | | EACH | reject |
| >>E-RAB ID | M | | 9.2.23 | | — | — |
| >>E-RAB Level QoS Parameters | M | | 9.2.9 | Includes necessary QoS parameters | — | — |
| >>eNB GTP | M | | GTP Tunnel | eNB endpoint of the X2 transport | — | — |

TABLE 3-continued

| | | | | | reject |
|---|---|---|---|---|---|
| Tunnel Endpoint | | Endpoint 9.2.1 | bearer. For delivery of UL PDUs. | | |
| WLAN Parameters | | | | | |
| >UE WLAN MAC address | | | | | |
| >UE WLAN Radio Capabilities | | | | | |
| >UE WLAN Security Keys | | | | | |

| Range bound | Explanation |
|---|---|
| maxnoofBearers | Maximum no. of E-RABs. Value is 256 |

In some demonstrative embodiments, WLAN access device 106 may respond to the WLAN Addition Request with a WLAN Addition Response, for example, if controller 149 selects to accept the WLAN addition Request. The WLAN addition Response may include, for example, an indication of one or more WLAN bearers, which have been successfully moved to the WLAN.

In some demonstrative embodiments, the WLAN Addition Response may have, for example, a structure including one or more information elements, e.g., as follows:

WLAN Addition Acknowledge

This message is sent by the WLAN to confirm the eNB about the WLAN addition preparation.

Direction: WLAN→eNB.

TABLE 4

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB UE X2AP ID | M | | eNB UE X2AP ID 9.2.24 | Allocated at the eNB | YES | reject |
| WLAN UE X2AP ID | M | | eNB UE X2AP ID 9.2.24 | Allocated at the WLAN | YES | reject |
| E-RABs Admitted To Be Added List | | 1 | | | YES | ignore |
| >E-RABs Admitted To Be Added Item | | 1 . . . <maxnoof Bearers> | | | EACH | ignore |
| >>E-RAB ID | M | | 9.2.23 | | — | — |
| >>WLAN GTP Tunnel Endpoint | M | | GTP Tunnel Endpoint 9.2.1 | Endpoint of the X2 transport bearer at the WLAN. | — | — |
| >>WLAN vMAC | M | | WLAN vMAC | WLAN vMAC identifying the bearer on the WLAN side | | |

TABLE 4-continued

| E-RABs Not Admitted List | O | | E-RAB List 9.2.28 | A value for E-RAB ID shall only be present once in E-RABs Admitted List IE and in E-RABs Not Admitted List IE. | YES | ignore |
|---|---|---|---|---|---|---|
| Range bound | | | Explanation | | | |
| maxnoofBearers | | | Maximum no. of E-RABs. Value is 256 | | | |

In some demonstrative embodiments, the "WLAN addition complete" message may be sent by a WLAN access device, e.g., an AP, to a cellular manager, e.g., an eNB, to indicate that a UE has successfully associated with the WLAN access device.

In some demonstrative embodiments, the WLAN Addition Complete message may have, for example, a structure including one or more information elements, e.g., as follows:
Direction: WLAN→eNB.

TABLE 5

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB UE X2AP ID | M | | eNB UE X2AP ID 9.2.24 | Allocated at the eNB | YES | reject |
| WLAN UE X2AP ID | M | | eNB UE X2AP ID 9.2.24 | Allocated at the WLAN | YES | reject |

In some demonstrative embodiments, cellular manager 104 and/or WLAN access device 106 may be configured to perform one or more operations, e.g., of a procedure (Xw WLAN modification procedure"), for example, to modify a UE context corresponding to at least one UE, e.g., UE 102, at WLAN access device 106, e.g., as described below.

In some demonstrative embodiments, the WLAN Modification procedure may be initiated either by cellular manager 104 or by WLAN access device 106, for example, to modify, establish, and/or release one or more bearer contexts, to transfer bearer contexts to and/or from the WLAN access device 106, and/or to modify other properties of the UE context within the same WLAN Access device 106.

In some demonstrative embodiments, the WLAN Modification procedure may include communicating a WLAN Modification Request, e.g., from an initiator of the modification, and communicating a WLAN Modification Response or Acknowledge message or WLAN Modification Failure message, e.g., in response to the WLAN Modification Request.

Some embodiments are described below with respect to a WLAN modification initiated by an eNB, e.g., cellular manager 104. In other embodiments, the WLAN modification may be initiated by a WLAN AP, a WLAN AC, or a WT node, e.g., WLAN access device 106.

In some demonstrative embodiments, the eNB may decide to move one or more additional E-RABs to the WLAN, and/or to add the WLAN to additional E-RABs. The eNB, e.g., cellular manager 104, may send a WLAN Modification Request message to a WT node, a WLAN AP or WLAN AC, managing the WLAN, e.g., WLAN access device 106. The WLAN Modification Request message may include one or more E-RAB parameters of the one or more E-RABs, TNL address information for user plane, e.g., the GTP-U TEID, the UE WLAN identification information, e.g., UE WLAN MAC, and/or any other information.

In some demonstrative embodiments, the WLAN AP, WLAN AC, or WT node, e.g., WLAN access device 106, may select whether or not to accept the WLAN Modification Request. The WLAN AP, WLAN AC, or WT node, e.g., WLAN access device 106, may respond with a Response Message or failure Message, and the eNB, e.g., cellular manager 104, may instruct the UE to associate with the WLAN AP, WLAN AC, or WT node, e.g., as described above.

In some demonstrative embodiments, the WLAN Modification Request may have, for example, a structure including one or more information elements, e.g., as follows:
eNB Modification Request
This message is sent by the eNB to the WLAN to request the preparation to modify WLAN resources for a specific UE.
Direction: eNB→WLAN.

TABLE 6

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB UE X2AP ID | M | | eNB UE X2AP ID 9.2.24 | Allocated at the eNB | YES | reject |
| WLAN UE X2AP ID | M | | eNB UE X2AP ID 9.2.24 | Allocated at the WLAN | YES | reject |
| Cause | M | | 9.2.6 | | YES | ignore |
| >E-RABs To Be Added List | | 0 . . . 1 | | | — | — |
| >>E-RABs To Be Added Item | | 1 . . . <maxnoof Bearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>eNB GTP Tunnel Endpoint | M | | GTP Tunnel Endpoint 9.2.1 | eNB endpoint of the X2 transport bearer. For delivery of UL PDUs. | — | — |
| >E-RABs To Be Modified List | | 0 . . . 1 | | | — | — |
| >>E-RABs To Be Modified Item | | 1 . . . <maxnoof Bearers> | | | EACH | ignore |
| >>>E-RAB ID | M | | 9.2.23 | | — | — |
| >>>E-RAB Level QoS Parameters | O | | 9.2.9 | Includes QoS parameters to be modified | — | — |
| >>>eNB GTP Tunnel Endpoint | O | | GTP Tunnel Endpoint 9.2.1 | eNB endpoint of the X2 transport bearer. For delivery of UL PDUs. | — | — |
| >E-RABs To Be Released List | | 0 . . . 1 | | | — | — |
| >>E-RABs To Be Released Item | | 1 . . . <maxnoof Bearers> | | | EACH | ignore |
| >>>E-RAB ID | M | | 9.2.23 | | — | — |

TABLE 6-continued

| | | | | | |
|---|---|---|---|---|---|
| >>>DL Forwarding GTP Tunnel Endpoint | O | GTP Tunnel Endpoint 9.2.1 | Identifies the X2 transport bearer used for forwarding of DL PDUs | — | — |

| Range bound | Explanation |
|---|---|
| maxnoofBearers | Maximum no. of E-RABs. Value is 256 |

In some demonstrative embodiments, WLAN access device 106 may respond to the WLAN Addition Request with a WLAN Modification Request Response/Acknowledge, for example, if controller 149 selects to accept the WLAN Modification Request.

In some demonstrative embodiments, the WLAN Modification Request Acknowledge may have, for example, a structure including one or more information elements, e.g., as follows:

WLAN Modification Request Acknowledge

This message is sent by the WLAN to confirm the eNB's request to modify the WLAN resources for a specific UE.

Direction: WLAN→eNB.

TABLE 7

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB UE X2AP ID | M | | eNB UE X2AP ID 9.2.24 | Allocated at the eNB | YES | ignore |
| WLAN UE X2AP ID | M | | eNB UE X2AP ID 9.2.24 | Allocated at the WLAN | YES | ignore |
| E-RABs Admitted List | | 0 . . . 1 | | | YES | ignore |
| >E-RABs Admitted To Be Added List | | 1 | | | — | — |
| >>E-RABs Admitted To Be Added Item | | 1 . . . <maxnoofBearers> | | | EACH | ignore |
| >>>E-RAB ID | M | | 9.2.23 | | — | — |
| >>>SeNB GTP Tunnel Endpoint | M | | GTP Tunnel Endpoint 9.2.1 | Endpoint of the X2 transport bearer at the WLAN. | — | — |
| >>>WLAN vMAC | M | | WLAN vMAC | WLAN vMAC identifying the bearer on the WLAN side | — | — |
| >E-RABs Admitted To Be Modified List | | 0 . . . 1 | | | — | — |
| >>E-RABs Admitted To Be Modified Item | | 1 . . . <maxnoofBearers> | | | EACH | ignore |
| >>>E-RAB ID | M | | 9.2.23 | | — | — |
| >>>WLAN GTP Tunnel Endpoint | O | | GTP Tunnel Endpoint 9.2.1 | Endpoint of the X2 transport bearer at the WLAN. | — | — |
| >E-RABs Admitted To Be Released List | | 0 . . . 1 | | | — | — |

TABLE 7-continued

| | | | | | | |
|---|---|---|---|---|---|---|
| >>E-RABs Admitted To Be Released Item | | 1 ... <maxnoof Bearers> | | | EACH | ignore |
| >>>E-RAB ID | M | | 9.2.23 | | — | — |
| E-RABs Not Admitted List | O | | E-RAB List 9.2.28 | A value for E-RAB ID shall only be present once in E-RABs Admitted List IE and in E-RABs Not Admitted List IE. | YES | ignore |

| Range bound | Explanation |
|---|---|
| maxnoofBearers | Maximum no. of E-RABs. Value is 256 |

In some demonstrative embodiments, cellular manager 104 and/or WLAN access device 106 may be configured to perform one or more operations, e.g., of a procedure (Xw WLAN change procedure"), for example, to transfer a UE context corresponding to UE 102 from a first WLAN access device 106 ("source WLAN access device") to a second WLAN access device ("target WLAN access device"), e.g., as described below.

In some demonstrative embodiments, cellular manager 104 may be configured to initiate the WLAN Change procedure, for example, to transfer the UE context, e.g., of UE 102, from a source WLAN, e.g., managed by WLAN access device 106, to a target WLAN, e.g., managed by another WLAN access device.

In some demonstrative embodiments, cellular manager 104 may be configured to initiate the WLAN Change procedure, for example, to perform intra-WLAN mobility (also referred to as "WLAN roaming").

In some demonstrative embodiments, in LTE/WLAN aggregation, intra-WLAN mobility, e.g., between WLAN APs, WLAN ACs, or WT nodes in LTE/WLAN aggregation mode, may be controlled by the network, e.g., using cellular manager 104.

In some demonstrative embodiments, cellular manager 104 may decide to move UE 102 from the source WLAN to the target WLAN, for example, based on UE WLAN measurement reporting, e.g., from WLAN access device 106, load of source and target WLANs, and/or any other information and/or criteria.

In some demonstrative embodiments, the WLAN Change procedure may include a WLAN release procedure, followed by a WLAN addition procedure.

In some demonstrative embodiments, controller 144 may be configured to initiate the WLAN addition procedure, e.g., as described above, towards the target WLAN access device.

In some demonstrative embodiments, controller 144 may be configured to trigger the WLAN Addition procedure towards the target WLAN access device, for example, by sending the WLAN Addition Request to the target WLAN access device, e.g., as described above.

In some demonstrative embodiments, the target WLAN access device may respond with a WLAN Addition Response, e.g., as described above, for example, if the target WLAN access device selects to accept the WLAN Addition Request. Alternatively, the target WLAN access device may respond with a WLAN Addition Failure Message.

In some demonstrative embodiments, the WLAN Addition Response may include, for example, the V-MAC or other bearer identifier assigned by the target WLAN access device, e.g., as described above.

In some demonstrative embodiments, controller 144 may be configured to initiate an association between UE 102 and the Target WLAN access device, for example, in parallel to the WLAN Addition procedure, or after completion of the WLAN addition procedure.

In some demonstrative embodiments, controller 144 may cause cellular manager 104 to send to UE 102 an RRC message, for example, a RRC Connection Reconfiguration or any other RRC message, including the WLAN bearer identifier, e.g., the V-MAC or other bearer identifier, to initiate the association between UE 102 and the target WLAN access device.

In some demonstrative embodiments, UE 102 may associate with the target WLAN, e.g., based on the WLAN bearer identifier.

In some demonstrative embodiments, the target WLAN access device may indicate to cellular manager 104 that the WLAN Addition procedure was successful.

In some demonstrative embodiments, cellular manager 104 and/or WLAN access device 106 may be configured to perform one or more operations, e.g., of a procedure (Xw WLAN release procedure"), for example, to initiate a release of UE context, e.g., corresponding to UE 102, at the WLAN access device 106, e.g., as described below.

In some demonstrative embodiments, the Xw WLAN release procedure may be initiated either by cellular manager 104 or WLAN access device 106.

In some demonstrative embodiments, the WLAN release procedure may include communicating a WLAN Release Request, e.g., from an initiator of the WLAN Release procedure.

In some demonstrative embodiments, the WLAN Release Request may have, for example, a structure including one or more information elements, e.g., as follows:

WLAN Release Request

This message is sent by the eNB to the WLAN to request the release of resources.

Direction: WLAN→eNB.

TABLE 8

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB UE X2AP ID | M | | eNB UE X2AP ID 9.2.24 | Allocated at the eNB | YES | reject |
| WLAN UE X2AP ID | O | | eNB UE X2AP ID 9.2.24 | Allocated at the WLAN | YES | reject |
| Cause | O | | 9.2.6 | | YES | ignore |
| E-RABs To Be Released List | | 0 ... 1 | | | — | — |
| > E-RABs To Be Released Item | | 1 ... <maxnoof Bearers> | | | EACH | ignore |
| >>E-RAB ID | M | | 9.2.23 | | — | — |
| >>DL Forwarding GTP Tunnel Endpoint | O | | GTP Tunnel Endpoint 9.2.1 | Identifies the X2 transport bearer. used for forwarding of DL PDUs | — | — |

| Range bound | Explanation |
|---|---|
| maxnoofBearers | Maximum no. of E-RABs. Value is 256 |

In some demonstrative embodiments, cellular manager 104 and/or WLAN access device 106 may be configured to perform one or more operations, e.g., of a procedure (Xw WLAN Status Report procedure"), for example, to report statistics, for example, on per-UE or per-bearer basis, e.g., from WLAN access device 106 to cellular manager 104.

In some demonstrative embodiments, the WLAN Status Report Procedure may be performed in a periodic manner.

In some demonstrative embodiments, the WLAN Status Report Procedure may be triggered by cellular manager 104.

In some demonstrative embodiments, the WLAN Status Report Procedure may include communicating a WLAN Status Request, for example, from cellular manager 104 to WLAN access device 106, and/or communicating a WLAN Status Response or WLAN Status Failure message, for example, from WLAN access device 106 to cellular manager 104.

In some demonstrative embodiments, the WLAN Status Response message may include, for example, buffer information corresponding to a Transmit (TX) and/or Receive (RX) buffer status of WLAN access device 106, statistics information corresponding to packet transmission and reception statistics, and/or any other information.

Figure 2:
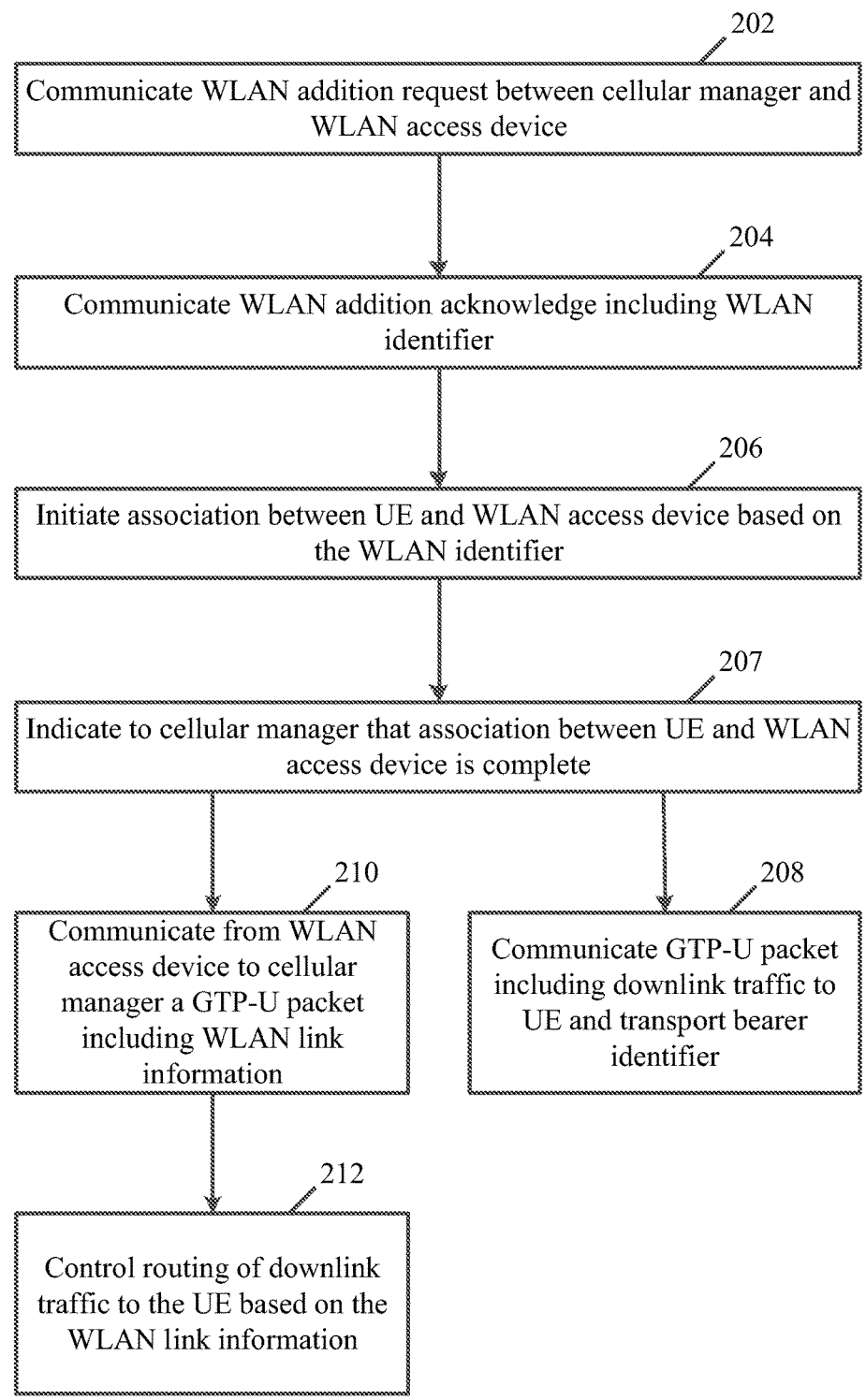
FIG. 2 is a schematic flow-chart illustration of a method of communicating between a cellular manager and a User Equipment (UE) via a Wireless Local Area Network (WLAN) access device, in accordance with some demonstrative embodiments.

Reference is made to FIG. 2, which schematically illustrates a method of communicating between a cellular manager and a UE via a WLAN access device, in accordance with some demonstrative embodiments. In some embodiments, one or more of the operations of the method of FIG. 2 may be performed by a wireless communication system e.g., system 100 (FIG. 1); a cellular manager, e.g., cellular manager 104 (FIG. 1); a WLAN access device, e.g., WLAN access device 106 (FIG. 1); an interface, e.g., interface 169 (FIG. 1), interface 167 (FIG. 1), interface 192 (FIG. 1), interface 161 (FIG. 1), interface 159 (FIG. 1), and/or interface 194 (FIG. 1); and/or a controller, e.g., controller 144 (FIG. 1) and/or controller 149 (FIG. 1).

As indicated at block 202, the method may include communicating between a cellular manager and a WLAN access device WLAN addition request including a WLAN identifier of a UE. For example, controller 144 (FIG. 1) may cause interface 169 (FIG. 1) to send to WLAN access device 106 (FIG. 1) a WLAN addition request including a WLAN identifier of UE 102 (FIG. 1), e.g., as described above.

As indicated at block 204, the method may include communicating between the WLAN access device and the cellular manager a WLAN addition acknowledge including a WLAN bearer identifier of a WLAN bearer between the WLAN access device and the UE. For example, controller 149 may cause interface 192 (FIG. 1) to send to cellular manager 104 (FIG. 1) a WLAN addition acknowledge including a WLAN bearer identifier of a WLAN bearer between WLAN access device 106 (FIG. 1) and UE 102 (FIG. 1), e.g., as described above.

As indicated at block 206, the method may include initiating an association between the UE and the WLAN access device based on the WLAN identifier. For example, cellular manager 104 (FIG. 1) may send to UE 102 (FIG. 1) an RRC message to request UE 102 (FIG. 1) to associate with WLAN access device, and WLAN access device 106 (FIG. 1) may associate with UE 102 (FIG. 1) based on the WLAN bearer identifier, e.g., as described above.

As indicated at block 207, the method may include indicating to the cellular manager that association between the UE and WLAN access device is successfully complete. For example, WLAN access device 106 (FIG. 1) may send to cellular manager 104 (FIG. 1) a WLAN addition complete message, e.g., as described above.

As indicated at block 208, the method may include communicating a GTP-U packet including downlink traffic for the UE from the cellular manager to the WLAN access device, and transport bearer information to identify a transport bearer between the cellular manager and the UE. For example, cellular manager 104 (FIG. 1) may send to WLAN access device 106 (FIG. 1), e.g., via interface 109 (FIG. 1), the GTP-U packet including the downlink traffic for UE 102 (FIG. 1) and the TEID corresponding to the transport bearer, e.g., as described above.

As indicated at block 210, the method may include communicating from the WLAN access device to the cellular manager a GTP-U packet including WLAN link information of a WLAN link corresponding to the WLAN bearer. For example, WLAN access device 106 (FIG. 1) may send to cellular manager 104 (FIG. 1) a GTP-U packet, e.g., via interface 199 (FIG. 1), including the WLAN link information, e.g., as described above.

As indicated at block 212, the method may include controlling routing of the downlink traffic to the UE via the WLAN access device, based at least on the WLAN link information. For example, controller 144 (FIG. 1) may control routing of the downlink traffic to UE 102 (FIG. 1) via WLAN access device 106 (FIG. 1), based at least on the WLAN link information from WLAN access device 106 (FIG. 1), e.g., as described above.

Figure 3:
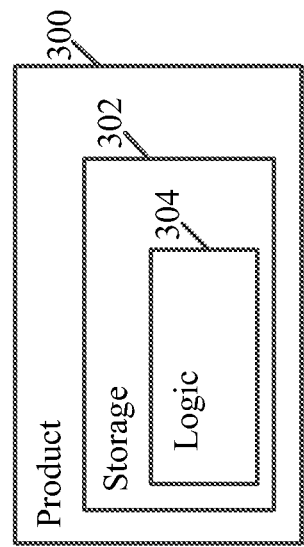
FIG. 3 is a schematic illustration of a product, in accordance with some demonstrative embodiments.

Reference is made to FIG. 3, which schematically illustrates a product of manufacture 300, in accordance with some demonstrative embodiments. Product 300 may include a non-transitory machine-readable storage medium 302 to store logic 304, which may be used, for example, to perform at least part of the functionality of a cellular manager, e.g., cellular manager 104 (FIG. 1); a WLAN access device, e.g., WLAN access device 106 (FIG. 1); an interface, e.g., interface 169 (FIG. 1), interface 167 (FIG. 1), interface 192 (FIG. 1), interface 161 (FIG. 1), interface 159 (FIG. 1), and/or interface 194 (FIG. 1); and/or a controller, e.g., controller 144 (FIG. 1) and/or controller 149 (FIG. 1); and/or to perform one or more operations of the method of FIG. 2. The phrase "non-transitory machine-readable medium" is directed to include all computer-readable media, with the sole exception being a transitory propagating signal.

In some demonstrative embodiments, product 300 and/or machine-readable storage medium 302 may include one or more types of computer-readable storage media capable of storing data, including volatile memory, non-volatile memory, removable or non-removable memory, erasable or non-erasable memory, writeable or re-writeable memory, and the like. For example, machine-readable storage medium 302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an evolved Node B (eNB) comprising an air interface to communicate with a User Equipment (UE) via a cellular link; a controller to route at least part of downlink traffic to the UE via a Wireless Local Area Network (WLAN) access device; and an access device interface to send to the WLAN access device a general packet radio service (GPRS) Tunneling Protocol User Plane (GTP-U) packet comprising the downlink traffic for the UE, and transport bearer information to identify a transport bearer between the eNB and the UE.

Example 2 includes the subject matter of Example 1, and optionally, wherein the access device interface is to receive from the WLAN access device a GTP-U packet comprising WLAN link information corresponding to a WLAN link between the WLAN access device and the UE.

Example 3 includes the subject matter of Example 2, and optionally, wherein the WLAN link information comprises an average data rate corresponding to the WLAN link.

Example 4 includes the subject matter of Example 2 or 3, and optionally, wherein the WLAN link information comprises link quality information corresponding to the WLAN link.

Example 5 includes the subject matter of any one of Examples 2-4, and optionally, wherein the WLAN link information comprises a WLAN buffer status corresponding to the WLAN link.

Example 6 includes the subject matter of any one of Examples 2-5, and optionally, wherein the WLAN link information comprises delivered and lost Packet Data Convergence Protocol (PDCP) Protocol Data Unit (PDU) information.

Example 7 includes the subject matter of any one of Examples 2-6, and optionally, wherein the controller is to control routing of the downlink traffic via the WLAN access device, based at least on the WLAN link information.

Example 8 includes the subject matter of any one of Examples 1-7, and optionally, wherein the transport bearer information comprises a Tunnel Endpoint Identifier (TEID) corresponding to the UE.

Example 9 includes the subject matter of any one of Examples 1-7, and optionally, wherein the transport bearer information comprises a WLAN Media Access Control (MAC) address corresponding to the UE.

Example 10 includes the subject matter of any one of Examples 1-9, and optionally, comprising a plurality of antennas; a memory; and a processor.

Example 11 includes a Wireless Local Area Network (WLAN) access device comprising an Evolved Node B (eNB) interface to receive from an eNB a general packet radio service (GPRS) Tunneling Protocol User Plane (GTP-U) packet comprising downlink traffic for a User Equipment (UE), and transport bearer information to identify a transport bearer between the eNB and the UE; a controller to determine a WLAN bearer between the WLAN access device and the UE based on the transport bearer information; and a UE interface to send the downlink traffic to the UE via the WLAN bearer.

Example 12 includes the subject matter of Example 11, and optionally, wherein the eNB interface is to send to the eNB a GTP-U packet comprising WLAN link information of a WLAN link corresponding to the WLAN bearer.

Example 13 includes the subject matter of Example 12, and optionally, wherein the WLAN link information comprises an average data rate corresponding to the WLAN link.

Example 14 includes the subject matter of Example 12 or 13, and optionally, wherein the WLAN link information comprises link quality information corresponding to the WLAN link.

Example 15 includes the subject matter of any one of Examples 12-14, and optionally, wherein the WLAN link information comprises a WLAN buffer status corresponding to the WLAN link.

Example 16 includes the subject matter of Examples 12-15, and optionally, wherein the WLAN link information comprises delivered and lost Packet Data Convergence Protocol (PDCP) Protocol Data Unit (PDU) information.

Example 17 includes the subject matter of any one of Examples 11-16, and optionally, wherein the transport bearer information comprises a Tunnel Endpoint Identifier (TEID) corresponding to the UE.

Example 18 includes the subject matter of any one of Examples 11-16, and optionally, wherein the transport bearer information comprises a WLAN Media Access Control (MAC) address corresponding to the UE.

Example 19 includes the subject matter of any one of Examples 11-18 being an Access Point (AP), the UE interface comprising a WLAN radio to transmit the downlink traffic to the UE via a WLAN link.

Example 20 includes the subject matter of any one of Examples 11-18 being an Access Controller (AC), the UE interface comprising an Access Point (AP) interface to send the downlink traffic to an AP.

Example 21 includes the subject matter of Examples 11-20, and optionally, comprising a memory; and a processor.

Example 22 includes an evolved Node B (eNB) comprising an air interface to communicate with a User Equipment (UE) traffic of at least one Evolved Universal Mobile Telecommunications System (UMTS) Terrestrial Radio Access Network (E-UTRAN) Radio Access Bearer (E-RAB); an access device interface to communicate with a Wireless Local Area Network (WLAN) access device; and a controller to route at least part of the traffic of the E-RAB via the WLAN Access device, the controller to cause the access device interface to send a WLAN addition request to the WLAN access device, the WLAN addition request comprising a WLAN identifier of the UE, the controller to process reception of a WLAN addition acknowledge from the WLAN access device via the access device interface, the WLAN addition acknowledge comprising a WLAN bearer identifier of a WLAN bearer between the WLAN access device and the UE, the controller to cause the air interface to send to the UE a Radio Resource Control (RRC) message comprising a request to associate with the WLAN access device and the WLAN bearer identifier.

Example 23 includes the subject matter of Example 22, and optionally, wherein the WLAN addition request comprises an identifier of the E-RAB, and one or more Quality of Service (QoS) parameters corresponding to the E-RAB.

Example 24 includes the subject matter of Example 22 or 23, and optionally, wherein the WLAN addition request comprises an identifier of a general packet radio service (GPRS) Tunneling Protocol (GTP) endpoint corresponding to the eNB.

Example 25 includes the subject matter of any one of Examples 22-24, and optionally, wherein the WLAN addition request comprises one or more WLAN parameters selected from the group consisting of a UE WLAN capability parameter, and a UE WLAN security key.

Example 26 includes the subject matter of any one of Examples 22-25, and optionally, wherein the WLAN addition acknowledge comprises an identifier of a general packet radio service (GPRS) Tunneling Protocol (GTP) endpoint corresponding to the WLAN access device.

Example 27 includes the subject matter of any one of Examples 22-26, and optionally, wherein the WLAN bearer identifier comprises a WLAN virtual Media Access Control (MAC).

Example 28 includes the subject matter of any one of Examples 22-26, and optionally, wherein the WLAN bearer identifier is a dedicated bearer identifier in a header of a WLAN air interface.

Example 29 includes the subject matter of any one of Examples 22-28, and optionally, wherein the controller is to send to the WLAN access device a WLAN modification request to perform, with respect to a UE context corresponding to the UE, at least one modification selected from a group consisting of modifying one or more parameters corresponding to the E-RAB, releasing routing of the E-RAB via the WLAN access device, and adding another E-RAB to be routed via the WLAN access device.

Example 30 includes the subject matter of any one of Examples 22-29, and optionally, wherein the controller is to determine to move the E-RAB to another WLAN access device, the controller to cause the access device interface to send another WLAN addition request to the another WLAN access device, the controller to process reception of another WLAN addition acknowledge from the another WLAN access device via the access device interface, the another WLAN addition acknowledge comprising another WLAN bearer identifier of another WLAN bearer between the another WLAN access device and the UE, the controller to cause the air interface to send to the UE another RRC message comprising a request to associate with the another WLAN access device and the another WLAN bearer identifier.

Example 31 includes the subject matter of any one of Examples 22-30, and optionally, wherein the controller is to send to the WLAN access device a WLAN release request to release a UE context at the WLAN access device, the WLAN release request comprising a list of one or more E-RAB identifiers associated with the UE context.

Example 32 includes the subject matter of any one of Examples 22-31, and optionally, comprising a plurality of antennas; a memory; and a processor.

Example 33 includes a Wireless Local Area Network (WLAN) access device comprising an Evolved Node B (eNB) interface to receive from an eNB a WLAN addition request comprising a WLAN identifier of a User Equipment (UE); a UE interface; and a controller to determine a WLAN bearer to communicate between the WLAN access device and the UE, to cause the eNB interface to send to the eNB a WLAN addition acknowledge comprising a WLAN bearer identifier of the WLAN bearer, and to cause the UE interface to associate with the UE based on the WLAN identifier of the UE.

Example 34 includes the subject matter of Example 33, and optionally, wherein the WLAN addition request comprises an identifier of at least one Evolved Universal Mobile Telecommunications System (UMTS) Terrestrial Radio Access Network (E-UTRAN) Radio Access Bearer (E-RAB), and one or more Quality of Service (QoS) parameters corresponding to the E-RAB.

Example 35 includes the subject matter of Example 33 or 34, and optionally, wherein the WLAN addition request comprises an identifier of a general packet radio service (GPRS) Tunneling Protocol (GTP) endpoint corresponding to at least one Evolved Universal Mobile Telecommunications System (UMTS) Terrestrial Radio Access Network (E-UTRAN) Radio Access Bearer (E-RAB).

Example 36 includes the subject matter of any one of Examples 33-35, and optionally, wherein the WLAN addition request comprises one or more WLAN parameters selected from the group consisting of a UE WLAN capability parameter, and a UE WLAN security key.

Example 37 includes the subject matter of any one of Examples 33-36, and optionally, wherein the WLAN addition acknowledge comprises an identifier of a general packet radio service (GPRS) Tunneling Protocol (GTP) endpoint corresponding to the WLAN access device.

Example 38 includes the subject matter of any one of Examples 33-37, and optionally, wherein the WLAN bearer identifier comprises a WLAN virtual Media Access Control (MAC).

Example 39 includes the subject matter of any one of Examples 33-37, and optionally, wherein the WLAN bearer identifier is a dedicated bearer identifier in a header of a WLAN air interface.

Example 40 includes the subject matter of any one of Examples 33-39, and optionally, wherein the controller is to process a WLAN modification request from the eNB to perform, with respect to a UE context corresponding to the UE, at least one modification selected from a group consisting of modifying one or more parameters corresponding to the UE, releasing routing of a bearer of the UE via the WLAN access device, and adding another bearer to be routed via the WLAN access device.

Example 41 includes the subject matter of any one of Examples 33-40, and optionally, wherein the controller is to process a WLAN release request to release a UE context at the WLAN access device, the WLAN release request comprising a list of one or more bearer identifiers associated with the UE context.

Example 42 includes the subject matter of any one of Examples 33-41, and optionally, comprising a memory; and a processor.

Example 43 includes a method to be performed at an evolved Node B (eNB), the method comprising communicating with a User Equipment (UE) via a cellular link; routing at least part of downlink traffic to the UE via a Wireless Local Area Network (WLAN) access device; and sending to the WLAN access device a general packet radio service (GPRS) Tunneling Protocol User Plane (GTP-U) packet comprising the downlink traffic for the UE, and transport bearer information to identify a transport bearer between the eNB and the UE.

Example 44 includes the subject matter of Example 43, and optionally, comprising receiving from the WLAN access device a GTP-U packet comprising WLAN link information corresponding to a WLAN link between the WLAN access device and the UE.

Example 45 includes the subject matter of Example 44, and optionally, wherein the WLAN link information comprises an average data rate corresponding to the WLAN link.

Example 46 includes the subject matter of Example 44 or 45, and optionally, wherein the WLAN link information comprises link quality information corresponding to the WLAN link.

Example 47 includes the subject matter of any one of Examples 44-46, and optionally, wherein the WLAN link information comprises a WLAN buffer status corresponding to the WLAN link.

Example 48 includes the subject matter of any one of Examples 44-47, and optionally, wherein the WLAN link information comprises delivered and lost Packet Data Convergence Protocol (PDCP) Protocol Data Unit (PDU) information.

Example 49 includes the subject matter of any one of Examples 43-48, and optionally, comprising controlling routing of the downlink traffic via the WLAN access device, based at least on the WLAN link information.

Example 50 includes the subject matter of any one of Examples 43-49, and optionally, wherein the transport bearer information comprises a Tunnel Endpoint Identifier (TEID) corresponding to the UE.

Example 51 includes the subject matter of any one of Examples 43-49, and optionally, wherein the transport bearer information comprises a WLAN Media Access Control (MAC) address corresponding to the UE.

Example 52 includes a method to be performed at a Wireless Local Area Network (WLAN) access device, the method comprising receiving from an Evolved Node B (eNB) a general packet radio service (GPRS) Tunneling Protocol User Plane (GTP-U) packet comprising downlink traffic for a User Equipment (UE), and transport bearer information to identify a transport bearer between the eNB and the UE; determining a WLAN bearer between the WLAN access device and the UE based on the transport bearer information; and sending the downlink traffic to the UE via the WLAN bearer.

Example 53 includes the subject matter of Example 52, and optionally, comprising sending to the eNB a GTP-U packet comprising WLAN link information of a WLAN link corresponding to the WLAN bearer.

Example 54 includes the subject matter of Example 53, and optionally, wherein the WLAN link information comprises an average data rate corresponding to the WLAN link.

Example 55 includes the subject matter of Example 53 or 54, and optionally, wherein the WLAN link information comprises link quality information corresponding to the WLAN link.

Example 56 includes the subject matter of any one of Examples 53-55, and optionally, wherein the WLAN link information comprises a WLAN buffer status corresponding to the WLAN link.

Example 57 includes the subject matter of Examples 53-56, and optionally, wherein the WLAN link information comprises delivered and lost Packet Data Convergence Protocol (PDCP) Protocol Data Unit (PDU) information.

Example 58 includes the subject matter of any one of Examples 52-57, and optionally, wherein the transport bearer information comprises a Tunnel Endpoint Identifier (TEID) corresponding to the UE.

Example 59 includes the subject matter of any one of Examples 52-57, and optionally, wherein the transport bearer information comprises a WLAN Media Access Control (MAC) address corresponding to the UE.

Example 60 includes the subject matter of any one of Examples 52-59, and optionally, comprising transmitting the downlink traffic to the UE via a WLAN link.

Example 61 includes the subject matter of any one of Examples 52-59, and optionally, comprising sending the downlink traffic to an Access Point (AP).

Example 62 includes a method to be performed at an evolved Node B (eNB), the method comprising communicating with a User Equipment (UE) traffic of at least one Evolved Universal Mobile Telecommunications System (UMTS) Terrestrial Radio Access Network (E-UTRAN) Radio Access Bearer (E-RAB); communicating with a Wireless Local Area Network (WLAN) access device; sending a WLAN addition request to the WLAN access device, the WLAN addition request comprising a WLAN identifier of the UE; processing reception of a WLAN addition acknowledge from the WLAN access device, the WLAN addition acknowledge comprising a WLAN bearer identifier of a WLAN bearer between the WLAN access device and the UE; and sending to the UE a Radio Resource Control (RRC) message comprising a request to associate with the WLAN access device and the WLAN bearer identifier.

Example 63 includes the subject matter of Example 62, and optionally, wherein the WLAN addition request comprises an identifier of the E-RAB, and one or more Quality of Service (QoS) parameters corresponding to the E-RAB.

Example 64 includes the subject matter of Example 62 or 63, and optionally, wherein the WLAN addition request comprises an identifier of a general packet radio service (GPRS) Tunneling Protocol (GTP) endpoint corresponding to the eNB.

Example 65 includes the subject matter of any one of Examples 62-64, and optionally, wherein the WLAN addition request comprises one or more WLAN parameters selected from the group consisting of a UE WLAN capability parameter, and a UE WLAN security key.

Example 66 includes the subject matter of any one of Examples 62-65, and optionally, wherein the WLAN addition acknowledge comprises an identifier of a general packet radio service (GPRS) Tunneling Protocol (GTP) endpoint corresponding to the WLAN access device.

Example 67 includes the subject matter of any one of Examples 62-66, and optionally, wherein the WLAN bearer identifier comprises a WLAN virtual Media Access Control (MAC).

Example 68 includes the subject matter of any one of Examples 62-66, and optionally, wherein the WLAN bearer identifier is a dedicated bearer identifier in a header of a WLAN air interface.

Example 69 includes the subject matter of any one of Examples 62-68, and optionally, comprising sending to the WLAN access device a WLAN modification request to perform, with respect to a UE context corresponding to the UE, at least one modification selected from a group consisting of modifying one or more parameters corresponding to the E-RAB, releasing routing of the E-RAB via the WLAN access device, and adding another E-RAB to be routed via the WLAN access device.

Example 70 includes the subject matter of any one of Examples 62-69, and optionally, comprising determining to move the E-RAB to another WLAN access device, sending another WLAN addition request to the another WLAN access device, processing reception of another WLAN addition acknowledge from the another WLAN access device, the another WLAN addition acknowledge comprising another WLAN bearer identifier of another WLAN bearer between the another WLAN access device and the UE, and sending to the UE another RRC message comprising a request to associate with the another WLAN access device and the another WLAN bearer identifier.

Example 71 includes the subject matter of any one of Examples 62-70, and optionally, comprising sending to the WLAN access device a WLAN release request to release a UE context at the WLAN access device, the WLAN release request comprising a list of one or more E-RAB identifiers associated with the UE context.

Example 72 includes a method to be performed at a Wireless Local Area Network (WLAN) access device, the method comprising receiving from an evolved node B (eNB) a WLAN addition request comprising a WLAN identifier of a User Equipment (UE); determining a WLAN bearer to communicate between the WLAN access device and the UE; sending to the eNB a WLAN addition acknowledge comprising a WLAN bearer identifier of the WLAN bearer; and associating with the UE based on the WLAN identifier of the UE.

Example 73 includes the subject matter of Example 72, and optionally, wherein the WLAN addition request comprises an identifier of at least one Evolved Universal Mobile Telecommunications System (UMTS) Terrestrial Radio Access Network (E-UTRAN) Radio Access Bearer (E-RAB), and one or more Quality of Service (QoS) parameters corresponding to the E-RAB.

Example 74 includes the subject matter of Example 72 or 73, and optionally, wherein the WLAN addition request comprises an identifier of a general packet radio service (GPRS) Tunneling Protocol (GTP) endpoint corresponding to at least one Evolved Universal Mobile Telecommunications System (UMTS) Terrestrial Radio Access Network (E-UTRAN) Radio Access Bearer (E-RAB).

Example 75 includes the subject matter of any one of Examples 72-74, and optionally, wherein the WLAN addition request comprises one or more WLAN parameters selected from the group consisting of a UE WLAN capability parameter, and a UE WLAN security key.

Example 76 includes the subject matter of any one of Examples 72-75, and optionally, wherein the WLAN addition acknowledge comprises an identifier of a general packet radio service (GPRS) Tunneling Protocol (GTP) endpoint corresponding to the WLAN access device.

Example 77 includes the subject matter of any one of Examples 72-76, and optionally, wherein the WLAN bearer identifier comprises a WLAN virtual Media Access Control (MAC).

Example 78 includes the subject matter of any one of Examples 72-76, and optionally, wherein the WLAN bearer identifier is a dedicated bearer identifier in a header of a WLAN air interface.

Example 79 includes the subject matter of any one of Examples 72-78, and optionally, comprising processing a WLAN modification request from the eNB to perform, with respect to a UE context corresponding to the UE, at least one modification selected from a group consisting of modifying one or more parameters corresponding to the UE, releasing routing of a bearer of the UE via the WLAN access device, and adding another bearer to be routed via the WLAN access device.

Example 80 includes the subject matter of any one of Examples 72-79, and optionally, comprising processing a WLAN release request to release a UE context at the WLAN access device, the WLAN release request comprising a list of one or more bearer identifiers associated with the UE context.

Example 81 includes a product including one or more tangible computer-readable non-transitory storage media comprising computer-executable instructions operable to, when executed by at least one computer processor, enable the at least one computer processor to implement a method at an evolved Node B (eNB), the method comprising communicating with a User Equipment (UE) via a cellular link; routing at least part of downlink traffic to the UE via a Wireless Local Area Network (WLAN) access device; and sending to the WLAN access device a general packet radio service (GPRS) Tunneling Protocol User Plane (GTP-U) packet comprising the downlink traffic for the UE, and transport bearer information to identify a transport bearer between the eNB and the UE.

Example 82 includes the subject matter of Example 81, and optionally, wherein the method comprises receiving from the WLAN access device a GTP-U packet comprising WLAN link information corresponding to a WLAN link between the WLAN access device and the UE.

Example 83 includes the subject matter of Example 82, and optionally, wherein the WLAN link information comprises an average data rate corresponding to the WLAN link.

Example 84 includes the subject matter of Example 82 or 83, and optionally, wherein the WLAN link information comprises link quality information corresponding to the WLAN link.

Example 85 includes the subject matter of any one of Examples 82-84, and optionally, wherein the WLAN link information comprises a WLAN buffer status corresponding to the WLAN link.

Example 86 includes the subject matter of any one of Examples 82-85, and optionally, wherein the WLAN link information comprises delivered and lost Packet Data Convergence Protocol (PDCP) Protocol Data Unit (PDU) information.

Example 87 includes the subject matter of any one of Examples 81-86, and optionally, wherein the method comprises controlling routing of the downlink traffic via the WLAN access device, based at least on the WLAN link information.

Example 88 includes the subject matter of any one of Examples 81-87, and optionally, wherein the transport bearer information comprises a Tunnel Endpoint Identifier (TEID) corresponding to the UE.

Example 89 includes the subject matter of any one of Examples 81-87, and optionally, wherein the transport bearer information comprises a WLAN Media Access Control (MAC) address corresponding to the UE.

Example 90 includes a product including one or more tangible computer-readable non-transitory storage media comprising computer-executable instructions operable to, when executed by at least one computer processor, enable the at least one computer processor to implement a method at a Wireless Local Area Network (WLAN) access device, the method comprising receiving from an Evolved Node B (eNB) a general packet radio service (GPRS) Tunneling Protocol User Plane (GTP-U) packet comprising downlink traffic for a User Equipment (UE), and transport bearer information to identify a transport bearer between the eNB and the UE; determining a WLAN bearer between the WLAN access device and the UE based on the transport bearer information; and sending the downlink traffic to the UE via the WLAN bearer.

Example 91 includes the subject matter of Example 90, and optionally, wherein the method comprises sending to the eNB a GTP-U packet comprising WLAN link information of a WLAN link corresponding to the WLAN bearer.

Example 92 includes the subject matter of Example 91, and optionally, wherein the WLAN link information comprises an average data rate corresponding to the WLAN link.

Example 93 includes the subject matter of Example 91 or 92, and optionally, wherein the WLAN link information comprises link quality information corresponding to the WLAN link.

Example 94 includes the subject matter of any one of Examples 91-93, and optionally, wherein the WLAN link information comprises a WLAN buffer status corresponding to the WLAN link.

Example 95 includes the subject matter of Examples 91-94, and optionally, wherein the WLAN link information comprises delivered and lost Packet Data Convergence Protocol (PDCP) Protocol Data Unit (PDU) information.

Example 96 includes the subject matter of any one of Examples 90-95, and optionally, wherein the transport bearer information comprises a Tunnel Endpoint Identifier (TEID) corresponding to the UE.

Example 97 includes the subject matter of any one of Examples 90-95, and optionally, wherein the transport bearer information comprises a WLAN Media Access Control (MAC) address corresponding to the UE.

Example 98 includes the subject matter of any one of Examples 90-97, and optionally, wherein the method comprises transmitting the downlink traffic to the UE via a WLAN link.

Example 99 includes the subject matter of any one of Examples 90-97, and optionally, wherein the method comprises sending the downlink traffic to an Access Point (AP).

Example 100 includes a product including one or more tangible computer-readable non-transitory storage media comprising computer-executable instructions operable to, when executed by at least one computer processor, enable the at least one computer processor to implement a method at an evolved Node B (eNB), the method comprising communicating with a User Equipment (UE) traffic of at least one Evolved Universal Mobile Telecommunications System (UMTS) Terrestrial Radio Access Network (E-UTRAN) Radio Access Bearer (E-RAB); communicating with a Wireless Local Area Network (WLAN) access device; sending a WLAN addition request to the WLAN access device, the WLAN addition request comprising a WLAN identifier of the UE; processing reception of a WLAN addition acknowledge from the WLAN access device, the WLAN addition acknowledge comprising a WLAN bearer identifier of a WLAN bearer between the WLAN access device and the UE; and sending to the UE a Radio Resource Control (RRC) message comprising a request to associate with the WLAN access device and the WLAN bearer identifier.

Example 101 includes the subject matter of Example 100, and optionally, wherein the WLAN addition request comprises an identifier of the E-RAB, and one or more Quality of Service (QoS) parameters corresponding to the E-RAB.

Example 102 includes the subject matter of Example 100 or 101, and optionally, wherein the WLAN addition request comprises an identifier of a general packet radio service (GPRS) Tunneling Protocol (GTP) endpoint corresponding to the eNB.

Example 103 includes the subject matter of any one of Examples 100-102, and optionally, wherein the WLAN addition request comprises one or more WLAN parameters selected from the group consisting of a UE WLAN capability parameter, and a UE WLAN security key.

Example 104 includes the subject matter of any one of Examples 100-103, and optionally, wherein the WLAN addition acknowledge comprises an identifier of a general packet radio service (GPRS) Tunneling Protocol (GTP) endpoint corresponding to the WLAN access device.

Example 105 includes the subject matter of any one of Examples 100-104, and optionally, wherein the WLAN bearer identifier comprises a WLAN virtual Media Access Control (MAC).

Example 106 includes the subject matter of any one of Examples 100-104, and optionally, wherein the WLAN bearer identifier is a dedicated bearer identifier in a header of a WLAN air interface.

Example 107 includes the subject matter of any one of Examples 100-106, and optionally, wherein the method comprises sending to the WLAN access device a WLAN modification request to perform, with respect to a UE context corresponding to the UE, at least one modification selected from a group consisting of modifying one or more parameters corresponding to the E-RAB, releasing routing of the E-RAB via the WLAN access device, and adding another E-RAB to be routed via the WLAN access device.

Example 108 includes the subject matter of any one of Examples 100-107, and optionally, wherein the method comprises determining to move the E-RAB to another WLAN access device, sending another WLAN addition request to the another WLAN access device, processing reception of another WLAN addition acknowledge from the another WLAN access device, the another WLAN addition acknowledge comprising another WLAN bearer identifier of another WLAN bearer between the another WLAN access device and the UE, and sending to the UE another RRC message comprising a request to associate with the another WLAN access device and the another WLAN bearer identifier.

Example 109 includes the subject matter of any one of Examples 100-108, and optionally, wherein the method comprises sending to the WLAN access device a WLAN release request to release a UE context at the WLAN access device, the WLAN release request comprising a list of one or more E-RAB identifiers associated with the UE context.

Example 110 includes a product including one or more tangible computer-readable non-transitory storage media comprising computer-executable instructions operable to, when executed by at least one computer processor, enable the at least one computer processor to implement a method at a Wireless Local Area Network (WLAN) access device, the method comprising receiving from an evolved node B (eNB) a WLAN addition request comprising a WLAN identifier of a User Equipment (UE); determining a WLAN bearer to communicate between the WLAN access device and the UE; sending to the eNB a WLAN addition acknowledge comprising a WLAN bearer identifier of the WLAN bearer; and associating with the UE based on the WLAN identifier of the UE.

Example 111 includes the subject matter of Example 110, and optionally, wherein the WLAN addition request comprises an identifier of at least one Evolved Universal Mobile Telecommunications System (UMTS) Terrestrial Radio Access Network (E-UTRAN) Radio Access Bearer (E-RAB), and one or more Quality of Service (QoS) parameters corresponding to the E-RAB.

Example 112 includes the subject matter of Example 110 or 111, and optionally, wherein the WLAN addition request comprises an identifier of a general packet radio service (GPRS) Tunneling Protocol (GTP) endpoint corresponding to at least one Evolved Universal Mobile Telecommunications System (UMTS) Terrestrial Radio Access Network (E-UTRAN) Radio Access Bearer (E-RAB).

Example 113 includes the subject matter of any one of Examples 110-112, and optionally, wherein the WLAN addition request comprises one or more WLAN parameters selected from the group consisting of a UE WLAN capability parameter, and a UE WLAN security key.

Example 114 includes the subject matter of any one of Examples 110-113, and optionally, wherein the WLAN addition acknowledge comprises an identifier of a general packet radio service (GPRS) Tunneling Protocol (GTP) endpoint corresponding to the WLAN access device.

Example 115 includes the subject matter of any one of Examples 110-114, and optionally, wherein the WLAN bearer identifier comprises a WLAN virtual Media Access Control (MAC).

Example 116 includes the subject matter of any one of Examples 110-114, and optionally, wherein the WLAN bearer identifier is a dedicated bearer identifier in a header of a WLAN air interface.

Example 117 includes the subject matter of any one of Examples 110-116, and optionally, wherein the method comprises processing a WLAN modification request from the eNB to perform, with respect to a UE context corresponding to the UE, at least one modification selected from a group consisting of modifying one or more parameters corresponding to the UE, releasing routing of a bearer of the UE via the WLAN access device, and adding another bearer to be routed via the WLAN access device.

Example 118 includes the subject matter of any one of Examples 110-117, and optionally, wherein the method comprises processing a WLAN release request to release a UE context at the WLAN access device, the WLAN release request comprising a list of one or more bearer identifiers associated with the UE context.

Example 119 includes an apparatus of communication by an evolved Node B (eNB), the apparatus comprising means for communicating with a User Equipment (UE) via a cellular link; means for routing at least part of downlink traffic to the UE via a Wireless Local Area Network (WLAN) access device; and means for sending to the WLAN access device a general packet radio service (GPRS) Tunneling Protocol User Plane (GTP-U) packet comprising the downlink traffic for the UE, and transport bearer information to identify a transport bearer between the eNB and the UE.

Example 120 includes the subject matter of Example 119, and optionally, comprising means for receiving from the WLAN access device a GTP-U packet comprising WLAN link information corresponding to a WLAN link between the WLAN access device and the UE.

Example 121 includes the subject matter of Example 120, and optionally, wherein the WLAN link information comprises an average data rate corresponding to the WLAN link.

Example 122 includes the subject matter of Example 120 or 121, and optionally, wherein the WLAN link information comprises link quality information corresponding to the WLAN link.

Example 123 includes the subject matter of any one of Examples 120-122, and optionally, wherein the WLAN link information comprises a WLAN buffer status corresponding to the WLAN link.

Example 124 includes the subject matter of any one of Examples 120-123, and optionally, wherein the WLAN link information comprises delivered and lost Packet Data Convergence Protocol (PDCP) Protocol Data Unit (PDU) information.

Example 125 includes the subject matter of any one of Examples 119-124, and optionally, comprising means for controlling routing of the downlink traffic via the WLAN access device, based at least on the WLAN link information.

Example 126 includes the subject matter of any one of Examples 119-125, and optionally, wherein the transport bearer information comprises a Tunnel Endpoint Identifier (TEID) corresponding to the UE.

Example 127 includes the subject matter of any one of Examples 119-125, and optionally, wherein the transport bearer information comprises a WLAN Media Access Control (MAC) address corresponding to the UE.

Example 128 includes an apparatus of communication by a Wireless Local Area Network (WLAN) access device, the apparatus comprising means for receiving from an Evolved Node B (eNB) a general packet radio service (GPRS) Tunneling Protocol User Plane (GTP-U) packet comprising downlink traffic for a User Equipment (UE), and transport bearer information to identify a transport bearer between the eNB and the UE; means for determining a WLAN bearer between the WLAN access device and the UE based on the transport bearer information; and means for sending the downlink traffic to the UE via the WLAN bearer.

Example 129 includes the subject matter of Example 128, and optionally, comprising means for sending to the eNB a GTP-U packet comprising WLAN link information of a WLAN link corresponding to the WLAN bearer.

Example 130 includes the subject matter of Example 129, and optionally, wherein the WLAN link information comprises an average data rate corresponding to the WLAN link.

Example 131 includes the subject matter of Example 129 or 130, and optionally, wherein the WLAN link information comprises link quality information corresponding to the WLAN link.

Example 132 includes the subject matter of any one of Examples 129-131, and optionally, wherein the WLAN link information comprises a WLAN buffer status corresponding to the WLAN link.

Example 133 includes the subject matter of Examples 129-132, and optionally, wherein the WLAN link information comprises delivered and lost Packet Data Convergence Protocol (PDCP) Protocol Data Unit (PDU) information.

Example 134 includes the subject matter of any one of Examples 128-133, and optionally, wherein the transport bearer information comprises a Tunnel Endpoint Identifier (TEID) corresponding to the UE.

Example 135 includes the subject matter of any one of Examples 128-133, and optionally, wherein the transport bearer information comprises a WLAN Media Access Control (MAC) address corresponding to the UE.

Example 136 includes the subject matter of any one of Examples 128-135, and optionally, comprising means for transmitting the downlink traffic to the UE via a WLAN link.

Example 137 includes the subject matter of any one of Examples 128-135, and optionally, comprising means for sending the downlink traffic to an Access Point (AP).

Example 138 includes an apparatus of communication by an evolved Node B (eNB), the apparatus comprising means for communicating with a User Equipment (UE) traffic of at least one Evolved Universal Mobile Telecommunications System (UMTS) Terrestrial Radio Access Network (E-UTRAN) Radio Access Bearer (E-RAB); means for communicating with a Wireless Local Area Network (WLAN) access device; means for sending a WLAN addition request to the WLAN access device, the WLAN addition request comprising a WLAN identifier of the UE; means for processing reception of a WLAN addition acknowledge from the WLAN access device, the WLAN addition acknowledge comprising a WLAN bearer identifier of a WLAN bearer between the WLAN access device and the UE; and means for sending to the UE a Radio Resource Control (RRC) message comprising a request to associate with the WLAN access device and the WLAN bearer identifier.

Example 139 includes the subject matter of Example 138, and optionally, wherein the WLAN addition request comprises an identifier of the E-RAB, and one or more Quality of Service (QoS) parameters corresponding to the E-RAB.

Example 140 includes the subject matter of Example 138 or 139, and optionally, wherein the WLAN addition request comprises an identifier of a general packet radio service (GPRS) Tunneling Protocol (GTP) endpoint corresponding to the eNB.

Example 141 includes the subject matter of any one of Examples 138-140, and optionally, wherein the WLAN addition request comprises one or more WLAN parameters selected from the group consisting of a UE WLAN capability parameter, and a UE WLAN security key.

Example 142 includes the subject matter of any one of Examples 138-141, and optionally, wherein the WLAN addition acknowledge comprises an identifier of a general packet radio service (GPRS) Tunneling Protocol (GTP) endpoint corresponding to the WLAN access device.

Example 143 includes the subject matter of any one of Examples 138-142, and optionally, wherein the WLAN bearer identifier comprises a WLAN virtual Media Access Control (MAC).

Example 144 includes the subject matter of any one of Examples 138-142, and optionally, wherein the WLAN bearer identifier is a dedicated bearer identifier in a header of a WLAN air interface.

Example 145 includes the subject matter of any one of Examples 138-144, and optionally, comprising means for sending to the WLAN access device a WLAN modification request to perform, with respect to a UE context corresponding to the UE, at least one modification selected from a group consisting of modifying one or more parameters corresponding to the E-RAB, releasing routing of the E-RAB via the WLAN access device, and adding another E-RAB to be routed via the WLAN access device.

Example 146 includes the subject matter of any one of Examples 138-145, and optionally, comprising means for determining to move the E-RAB to another WLAN access device, sending another WLAN addition request to the another WLAN access device, processing reception of another WLAN addition acknowledge from the another WLAN access device, the another WLAN addition acknowledge comprising another WLAN bearer identifier of another WLAN bearer between the another WLAN access device and the UE, and sending to the UE another RRC message comprising a request to associate with the another WLAN access device and the another WLAN bearer identifier.

Example 147 includes the subject matter of any one of Examples 138-146, and optionally, comprising means for sending to the WLAN access device a WLAN release request to release a UE context at the WLAN access device, the WLAN release request comprising a list of one or more E-RAB identifiers associated with the UE context.

Example 148 includes an apparatus of communication by a Wireless Local Area Network (WLAN) access device, the apparatus comprising means for receiving from an evolved node B (eNB) a WLAN addition request comprising a WLAN identifier of a User Equipment (UE); means for determining a WLAN bearer to communicate between the WLAN access device and the UE; means for sending to the eNB a WLAN addition acknowledge comprising a WLAN bearer identifier of the WLAN bearer; and means for associating with the UE based on the WLAN identifier of the UE.

Example 149 includes the subject matter of Example 148, and optionally, wherein the WLAN addition request comprises an identifier of at least one Evolved Universal Mobile Telecommunications System (UMTS) Terrestrial Radio Access Network (E-UTRAN) Radio Access Bearer (E-RAB), and one or more Quality of Service (QoS) parameters corresponding to the E-RAB.

Example 150 includes the subject matter of Example 148 or 149, and optionally, wherein the WLAN addition request comprises an identifier of a general packet radio service (GPRS) Tunneling Protocol (GTP) endpoint corresponding to at least one Evolved Universal Mobile Telecommunications System (UMTS) Terrestrial Radio Access Network (E-UTRAN) Radio Access Bearer (E-RAB).

Example 151 includes the subject matter of any one of Examples 148-150, and optionally, wherein the WLAN addition request comprises one or more WLAN parameters selected from the group consisting of a UE WLAN capability parameter, and a UE WLAN security key.

Example 152 includes the subject matter of any one of Examples 148-151, and optionally, wherein the WLAN addition acknowledge comprises an identifier of a general packet radio service (GPRS) Tunneling Protocol (GTP) endpoint corresponding to the WLAN access device.

Example 153 includes the subject matter of any one of Examples 148-152, and optionally, wherein the WLAN bearer identifier comprises a WLAN virtual Media Access Control (MAC).

Example 154 includes the subject matter of any one of Examples 148-152, and optionally, wherein the WLAN bearer identifier is a dedicated bearer identifier in a header of a WLAN air interface.

Example 155 includes the subject matter of any one of Examples 148-154, and optionally, comprising means for processing a WLAN modification request from the eNB to perform, with respect to a UE context corresponding to the UE, at least one modification selected from a group consisting of modifying one or more parameters corresponding to the UE, releasing routing of a bearer of the UE via the WLAN access device, and adding another bearer to be routed via the WLAN access device.

Example 156 includes the subject matter of any one of Examples 148-155, and optionally, comprising means for processing a WLAN release request to release a UE context at the WLAN access device, the WLAN release request comprising a list of one or more bearer identifiers associated with the UE context.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An evolved Node B (eNB) comprising:
   an air interface to communicate with a User Equipment (UE) via a cellular link;
   a controller to control routing of downlink traffic to the UE via a Wireless Local Area Network (WLAN) access device; and
   an access device interface to send to the WLAN access device a general packet radio service (GPRS) Tunneling Protocol User Plane (GTP-U) packet comprising the downlink traffic routed to the UE via the WLAN access device, the GTP-U packet comprising transport bearer information to identify a transport bearer between the eNB and the UE, the transport bearer information comprises a WLAN Media Access Control (MAC) address corresponding to the UE.

2. The eNB of claim 1, wherein said access device interface is to receive from the WLAN access device a GTP-U packet comprising WLAN link information corresponding to a WLAN link between the WLAN access device and the UE.

3. The eNB of claim 2, wherein the WLAN link information comprises an average data rate corresponding to the WLAN link.

4. The eNB of claim 2, wherein the WLAN link information comprises link quality information corresponding to the WLAN link.

5. The eNB of claim 2, wherein the WLAN link information comprises a WLAN buffer status corresponding to the WLAN link.

6. The eNB of claim 2, wherein the WLAN link information comprises delivered and lost Packet Data Convergence Protocol (PDCP) Protocol Data Unit (PDU) information.

7. The eNB of claim 2, wherein said controller is to control routing of the downlink traffic via the WLAN access device, based at least on the WLAN link information.

8. The eNB of claim 1, wherein the transport bearer information comprises a Tunnel Endpoint Identifier (TEID) corresponding to the UE.

9. The eNB of claim 1 comprising:
   a plurality of antennas;
   a memory; and
   a processor.

10. A Wireless Local Area Network (WLAN) access device comprising:
    an Evolved Node B (eNB) interface to receive from an eNB a general packet radio service (GPRS) Tunneling Protocol User Plane (GTP-U) packet comprising downlink traffic for a User Equipment (UE), the GTP-U packet comprising transport bearer information to identify a transport bearer between the eNB and the UE;
    a controller to determine a WLAN bearer between the WLAN access device and the UE based on the transport bearer information; and
    a UE interface to send the downlink traffic to the UE via the WLAN bearer.

11. The WLAN access device of claim 10, wherein said eNB interface is to send to the eNB a GTP-U packet comprising WLAN link information of a WLAN link corresponding to the WLAN bearer.

12. The WLAN access device of claim 10, wherein the transport bearer information comprises a Tunnel Endpoint Identifier (TED) corresponding to the UE.

13. The WLAN access device of claim 10, wherein the transport bearer information comprises a WLAN Media Access Control (MAC) address corresponding to the UE.

14. The WLAN access device of claim 10 comprising:
a memory; and
a processor.

* * * * *